United States Patent [19]
Farrauto et al.

[11] Patent Number: 5,627,124
[45] Date of Patent: *May 6, 1997

[54] CERIA-ALUMINA OXIDATION CATALYST

[75] Inventors: Robert J. Farrauto, Westfield; Kenneth E. Voss, Somerville; Ronald M. Heck, Frenchtown, all of N.J.

[73] Assignee: Engelhard Corporation, Iselin, N.J.

[*] Notice: The term of this patent shall not extend beyond the expiration date of Pat. No. 5,462,907.

[21] Appl. No.: 492,178

[22] Filed: Jun. 19, 1995

Related U.S. Application Data

[63] Continuation of Ser. No. 247,625, May 23, 1994, Pat. No. 5,462,907, which is a continuation of Ser. No. 973,461, Nov. 19, 1992, abandoned, which is a continuation-in-part of Ser. No. 798,437, Nov. 26, 1991, abandoned.

[51] Int. Cl.$^6$ .............................. B01J 23/10; B01J 21/04
[52] U.S. Cl. .............................. 502/304
[58] Field of Search .................... 502/304, 263, 502/262; 423/213.5, 215.5, 212

[56] References Cited

U.S. PATENT DOCUMENTS

| | | | |
|---|---|---|---|
| 3,161,605 | 12/1964 | Beck et al. | 502/243 |
| 3,993,572 | 11/1976 | Hindin et al. | 502/304 |
| 4,123,391 | 10/1978 | Noguchi et al. | 502/207 |
| 4,171,289 | 10/1979 | Wheelock | 502/333 |
| 4,189,404 | 2/1980 | Keith et al. | 502/304 |
| 4,200,552 | 4/1980 | Noguchi et al. | 502/263 |
| 4,477,417 | 10/1984 | Domesle et al. | 423/215.5 X |
| 4,492,769 | 1/1985 | Blanchard et al. | 502/304 X |
| 4,581,343 | 4/1986 | Blanchard et al. | 502/304 X |
| 4,613,583 | 9/1986 | Koch et al. | 502/303 X |
| 4,621,071 | 11/1986 | Blanchard et al. | 502/304 X |
| 4,707,341 | 11/1987 | Koch et al. | 423/213.5 X |
| 4,714,694 | 12/1987 | Wan et al. | 502/333 X |
| 4,749,671 | 6/1988 | Saito et al. | 502/304 X |
| 4,757,045 | 7/1988 | Turner et al. | 502/252 |
| 4,759,918 | 7/1988 | Homeier | 423/215.5 X |
| 4,782,038 | 11/1988 | Gandhi et al. | 502/304 |
| 4,849,399 | 7/1989 | Joy III et al. | 502/333 |
| 4,857,088 | 8/1989 | Mizrah et al. | 55/523 |
| 4,929,581 | 5/1990 | Steinwandel et al. | 502/2 |
| 5,000,929 | 3/1991 | Horiuchi et al. | 423/215.5 X |
| 5,059,575 | 10/1991 | Jorgensen et al. | 502/304 |
| 5,081,095 | 1/1992 | Bedford et al. | 502/304 |
| 5,145,825 | 9/1992 | Deeba et al. | 502/242 |

FOREIGN PATENT DOCUMENTS

| | | |
|---|---|---|
| 6769990 | 12/1990 | Australia . |
| 0211233 | 7/1987 | European Pat. Off. . |
| 0251703 | 9/1988 | European Pat. Off. . |
| 0321949 | 11/1989 | European Pat. Off. . |
| 0377290 | 7/1990 | European Pat. Off. . |
| 399891 | 11/1990 | European Pat. Off. . |
| 0404385 | 12/1990 | European Pat. Off. . |
| 2546770 | 9/1984 | France . |
| 3340682 | 5/1985 | Germany . |
| 59-142851 | 8/1984 | Japan . |
| 2236493 | 4/1991 | United Kingdom . |

OTHER PUBLICATIONS

Horiuchi et al, "The Effects of Flow–Through Type Oxidation Catalysts . . . ", SAE paper 900600, Feb., 1990.
G. Cornetti et al, SAE Paper #880715, U.S. Transient Cycle Versus ECE R.49 13–Mode Cycle, 1988, month not known.
Catalog Handbook of Fine Chemicals, Aldrich Chemical Company, Inc., Milwaukee, Wisconsin, 1990, pp. 47 and 48 month not known.
1986–87 Alfa Catalog, Morton Thiokol, Inc., Danvers, MA, 1986, p. 18, month not known.

Primary Examiner—Douglas J. McGinty
Attorney, Agent, or Firm—Richard A. Negin

[57] ABSTRACT

Oxidation catalyst compositions-include a catalytic material containing ceria-and alumina each having a surface area of at least about 10 m$^2$/g, for example, ceria and activated alumina in a weight ratio of from about 1.5:1 to 1:1.5. Optionally, platinum may be included in the catalytic material in amounts which are sufficient to promote gas phase oxidation of CO and HC but which are limited to preclude excessive oxidation of SO$_2$ to SO$_3$. Alternatively, palladium in any desired amount may be included in the catalytic material. The catalyst compositions have utility as oxidation catalysts for pollution abatement of exhausts contianing unburned fuel or oil. For example, the catalyst compositions may be used in a method to treat diesel engine exhaust by contacting the hot exhaust with the catalyst composition to promote the oxidation of the volatile organic fraction component of particulates in the exhaust.

12 Claims, 8 Drawing Sheets

CERIA-ALUMINA OXIDATION CATALYST

This application is a continuation of application Ser. No. 08/247,625, filed May 23, 1994 and now U.S. Pat. No. 5,462,907, which is a continuation of Ser. No. 07/973,461, filed Nov. 19, 1992 and now abandoned, which is a continuation-in-part of Ser. No. 07/798,437, filed Nov. 26, 1991 and now abandoned.

BACKGROUND OF THE INVENTION

1. Field of the Invention

This invention relates to a catalyst composition and method for the oxidation of oxidizeable components of a gas-borne stream, e.g., for the treatment of diesel engine exhaust, and more specifically to the treatment of such diesel exhaust to reduce the particulates content thereof.

2. Background and Related Art

As is well-known, gas-borne streams or engine exhausts often contain oxidizeable pollutants such as unburned fuel and vaporized or condensed oils. For example, diesel engine exhaust contains not only gaseous pollutants such as carbon monoxide ("CO") and unburned hydrocarbons ("HC"), but also soot particles which, as described in more detail below, comprise both a dry carbonaceous fraction and a hydrocarbon liquid which is sometimes referred to as a volatile organic fraction ("VOF"), which terminology will be used herein, or a soluble organic fraction. Accordingly, although sometimes loosely referred to as an "exhaust gas", the exhaust of a diesel engine is actually a heterogeneous material, comprising gaseous, liquid and solid components. The VOF may exist in diesel exhaust either as a vapor or as an aerosol (fine droplets of liquid condensate) depending on the temperature of the diesel exhaust.

Oxidation catalysts comprising a platinum group metal dispersed on a refractory metal oxide support are known for use in treating the exhaust of diesel engines in order to convert both HC and CO gaseous pollutants and particulates, i.e., soot particles, by catalyzing the oxidation of these pollutants to carbon dioxide and water. One problem faced in the treatment of diesel engine exhaust is presented by the presence of sulfur in diesel fuel. Upon combustion, sulfur forms sulfur dioxide and the oxidation catalyst catalyzes the $SO_2$ to $SO_3$ ("sulfates") with subsequent formation of sulfuric acid. The sulfates also react with activated alumina supports to form aluminum sulfates, which render activated alumina-containing catalysts inactive. In this regard, see U.S. Pat. No. 4,171,289 at column 1, line 39 et seq. Previous attempts to deal with the sulfation problem include the incorporation of large amounts of sulfate-resistant materials such as vanadium oxide into the support coating, or the use of alternative support materials such as α-alumina, silica and titania, which are sulfation-resistant materials. Further, as is known, the oxidation of $SO_2$ to $SO_3$ also adds to the particulates in the exhaust by forming condensible sulfur compounds, such as sulfuric acid, which condense upon, and thereby add to, the mass of particulates.

Generally, the prior art has attempted to deal with these problems by dispersing a suitable oxidation catalyst metal, such as one or more platinum group metals, upon a refractory metal oxide support which is resistant to sulfation.

Examples of catalysts designed for the treatment of diesel exhaust fumes and soot include U.S. Pat. No. 4,849,399 to Joy et al dated Jul. 18, 1989. This patent discloses catalytic composites which incorporate sulfur-resistant refractory inorganic oxides selected from the group consisting of titania, zirconia, and alumina treated with titania and/or zirconia (see column 6, lines 62–68).

U.S. Pat. No. 4,759,918 to Homeier et al dated Jul. 26, 1988 discloses catalysts for the treatment of diesel exhaust fumes and soot which incorporate sulfur-resistant refractory inorganic oxides selected from a group which includes silica, alumina, and silica-alumina (see column 3, lines 16–27).

SUMMARY OF THE INVENTION

Generally, in accordance with the present invention, there is provided an oxidation catalyst composition and a method for oxidizing oxidizeable components of a gas-borne stream, e.g., for treating diesel engine exhaust in which at least a volatile organic fraction component (described below) of the diesel exhaust particulates is converted to innocuous materials, and in which gaseous HC and CO pollutants may also be similarly converted. The objectives of the invention are attained by an oxidation catalyst comprising a base metal oxide catalytic material consisting essentially of a mixture of high surface area ceria and high surface area alumina, which optionally may have dispersed thereon a low loading of platinum catalytic metal. The method of the invention is attained by flowing a gas-borne stream, e.g., a diesel engine exhaust, into contact under reaction conditions with a catalyst composition as described above. In the case of treating diesel exhaust, the exhaust may be contacted under reaction conditions with a catalyst composition which contains palladium instead of a low loading of platinum but is otherwise as described above.

Specifically, in accordance with the present invention there is provided an oxidation catalyst composition which comprises a refractory carrier on which is disposed a coating of a ceria-alumina catalytic material consisting essentially of a combination of ceria and alumina each having a BET surface area of at least about 10 $m^2/g$, preferably the alumina having a surface area of from about 25 $m^2/g$ to 200 $m^2/g$ and the ceria having a surface area of from about 25 $m^2/g$ to 200 $m^2/g$.

In one embodiment of the invention, the ceria and alumina each comprises from about 5 to 95 percent, preferably from about 10 to 90 percent, more preferably from about 40 to 60 percent, by weight of the combination.

One aspect of the invention provides that the catalyst composition optionally further comprises a catalytically effective amount of platinum dispersed on the catalytic material in an amount not to exceed about 15 g/ft$^3$ of the catalyst composition. For example, the platinum may be present in the amount of from about 0.1 to 15 g/ft$^3$ of the composition, preferably from about 0.1 to 5 g/ft$^3$ of the composition. When the catalyst composition includes platinum, another aspect of the invention provides that at least a catalytically effective amount of the platinum is dispersed on the ceria. At least a catalytically effective amount of the platinum may also be dispersed on the alumina. Such dispersal of the platinum may be utilized whether the alumina and ceria are mixed in a single layer or are present in discrete layers of, respectively, ceria and alumina and, in the latter case, irrespective of which of the two layers is the top layer.

Still another aspect of the invention provides that the ceria comprises an aluminum-stabilized ceria. The alumina may also be stabilized against thermal degradation.

The ceria and alumina may be combined as a mixture and the mixture deposited as a single layer coating on the refractory carrier, or the ceria and alumina may be present in respective discrete superimposed layers of ceria and alumina. The ceria layer may be above or below the alumina layer.

In accordance with the method of the present invention, there is provided a method of treating diesel engine exhaust containing a volatile organic fraction. The method includes contacting the exhaust with a catalyst composition comprised of components as described above or with a catalyst composition comprised of components as described above but which optionally includes palladium instead of the optional platinum. Thus, the method includes contacting the gas-borne stream to be treated with a catalyst composition comprising ceria and alumina as described above, and optionally including platinum or palladium. When the optional palladium is employed in the composition, it may be present in the amount from about 0.1 to 200 g/ft$^3$, preferably in the amount of from about 20 to 120 g/ft$^3$, of the catalyst composition. In accordance with the method of the present invention, contacting of the diesel exhaust with the catalyst composition is carried out at a temperature high enough to catalyze oxidation of at least some of the volatile organic fraction of the exhaust, for example, an inlet temperature of from about 100° C. to 800° C.

Definations

As used herein and in the claims, the following terms shall have the indicated meanings.

The term "gas-borne stream" means a gaseous stream which may contain non-gaseous components such as solid particulates and/or vapors, liquid mist or droplets, and/or solid particulates wetted by a liquid.

The term "BET surface area" has its usual meaning of referring to the Brunauer, Emmett, Teller method for determining surface area by $N_2$ adsorption. Unless otherwise specifically stated, all references herein to the surface area of a ceria, alumina or other component refer to the BET surface area.

The term "activated alumina" has its usual meaning of a high BET surface area alumina, comprising primarily one or more of γ-, θ- and δ-aluminas (gamma, theta and delta).

The term "catalytically effective amount" means that the amount of material present is sufficient to affect the rate of reaction of the oxidation of pollutants in the exhaust being treated.

The term "inlet temperature" shall mean the temperature of the exhaust, test gas or other stream being treated immediately prior to initial contact of the exhaust, test gas or other stream with the catalyst composition.

The term "ceria-alumina catalytic material" means a combination of ceria particles and alumina particles each having a BET surface area of at least about 10 m$^2$/g, i.e., a combination of high surface area bulk ceria and high surface area bulk alumina, sometimes referred to as "activated alumina".

The term "combination" when used with reference to a combination of ceria and alumina includes combinations attained by mixtures or blends of ceria and alumina as well as superimposed discrete layers of ceria and alumina.

The term "aluminum-stabilized ceria" means ceria which has been stabilized against thermal degradation by incorporation therein of an aluminum compound. A suitable technique is shown in U.S. Pat. No. 4,714,694 of C. Z. Wan et al (the disclosure of which is incorporated by reference herein), in which ceria particles are impregnated with a liquid dispersion of an aluminum compound, e.g., an aqueous solution of a soluble aluminum compound such as aluminum nitrate, aluminum chloride, aluminum oxychloride, aluminum acetate, etc. After drying and calcining the impregnated ceria in air at a temperature of, e.g., from about 300° C. to 600° C. for a period of ½ to 2 hours, the aluminum compound impregnated into the ceria particles is converted into an effective thermal stabilizer for the ceria. The term "aluminum-stabilized" is used for economy of expression although the aluminum is probably present in the ceria as a compound, presumably alumina, and not as elemental aluminum.

Reference herein or in the claims to ceria or alumina being in "bulk" form means that the ceria or alumina is present as discrete particles (which may be, and usually are, of very small size, e.g., 10 to 20 microns in diameter or even smaller) as opposed to having been dispersed in solution form into another component. For example, the thermal stabilization of ceria particles (bulk ceria) with alumina as described above with respect to U.S. Pat. No. 4,714,694 results in the alumina being dispersed into the ceria particles and does not provide the dispersed alumina in "bulk" form, i.e., as discrete particles of alumina.

The abbreviation "TGA" stands for thermogravimetric analysis which is measure of the weight change (e.g., loss) of a sample as a function of temperature and/or time. The abbreviation "DTA" stands for differential thermal analysis which is measure of the amount of heat emitted (exotherm) or absorbed (endotherm) by a sample as a function of temperature and/or time.

BRIEF DESCRIPTION OF THE DRAWINGS

FIG. 5 shows the percentage conversion of the volatile organic fraction ("VOF"); FIG. 6 shows the percentage conversion of total particulate matter ("TPM") in the exhaust; FIG. 7 shows the gas phase conversion of hydrocarbons ("HC") and FIG. 8 shows the gas phase conversion of carbon monoxide ("CO").

DETAILED DESCRIPTION OF THE INVENTION AND PREFERRED EMBODIMENTS THEREOF

Figure 1:
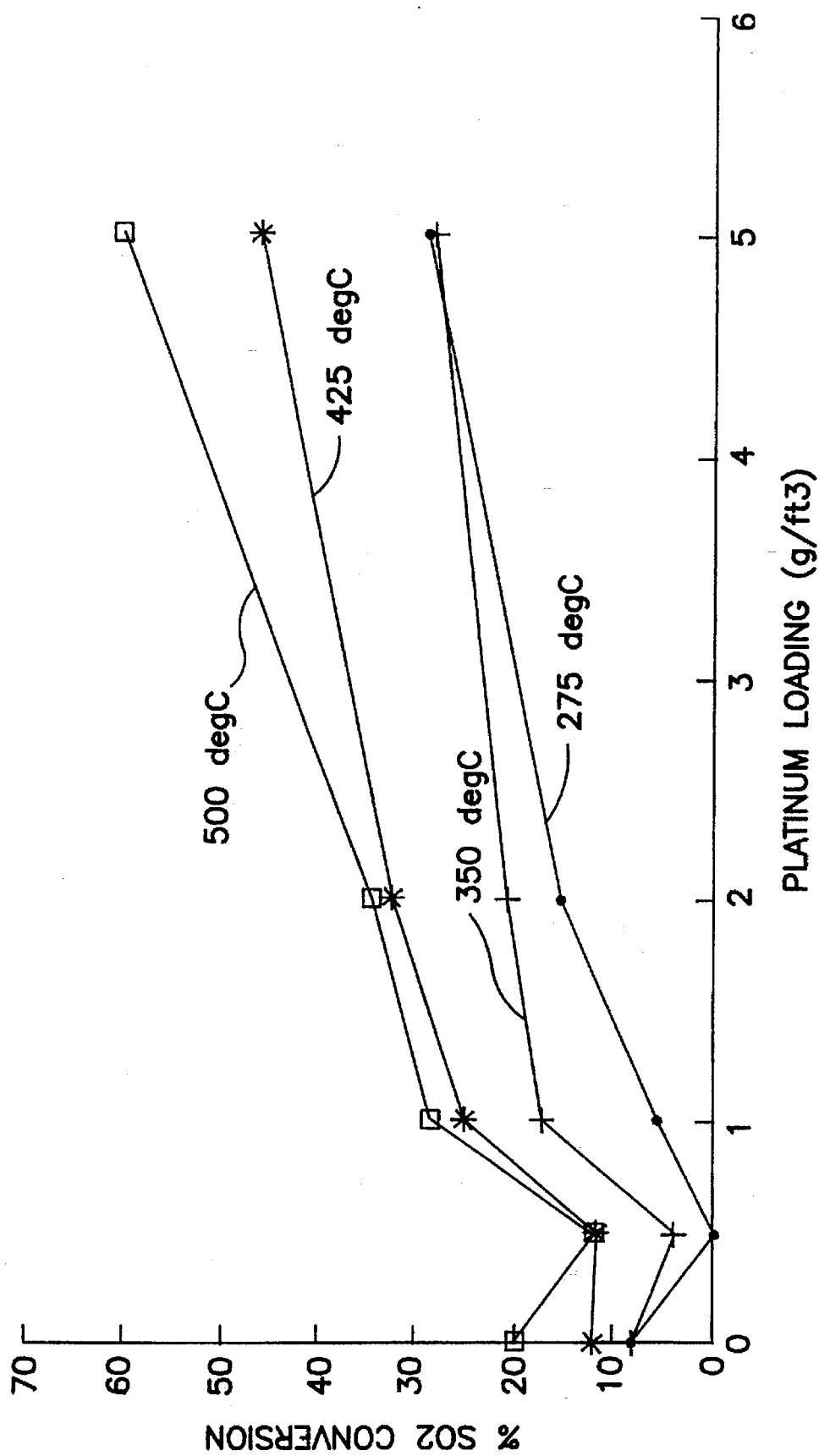
FIG. 1 is a plot of oxidation of $SO_2$ to $SO_3$ in a gas stream being treated with an oxidation catalyst, the degree of oxidation being plotted on the ordinate versus the platinum loading of the catalyst on the abscissa.

The present invention provides an oxidation catalyst composition which is effective for oxidizing oxidizeable components of a gas-borne stream, for example, for treating diesel engine exhaust. In the latter case, the composition is particularly effective with regard to reducing the total particulates in the exhaust. The carbonaceous particulates ("soot") component of diesel engine exhaust is, as is well-known, comprised of two major components. One component is relatively dry carbonaceous particles and the other, usually referred to as a volatile organic fraction ("VOF"), is a mixture of high molecular weight hydrocarbons comprised of unburned and partially burned diesel fuel and lubricating oil. The volatile organic fraction is present in the diesel exhaust as either a vapor phase or a liquid phase, or both, depending on the temperature of the exhaust. Generally, it is not feasible to attempt to remove or treat the dry, solid carbonaceous particulates component of the total particulates by catalytic treatment, and it is the VOF component which can be most effectively removed by conversion via utilization of an oxidation catalyst. Therefore, in order to reduce the total particulates discharged so as to meet present and impending Government regulations concerning maximum allowable total particulates, the volatile organic fraction, or at least a portion thereof, is oxidized to innocuous $CO_2$ and $HO_2$ by being contacted with an oxidation catalyst under suitable reaction conditions. The required U.S. Government limits for 1991 on HC, CO, nitrogen oxides ("$NO_x$") and total particulate emissions ("TPM") in diesel engine exhaust have been largely met by suitable engine design modifications. For 1994 the HC, CO and $NO_x$ limits remain unchanged from 1991 standards but the upper limit on TPM will be reduced from the 1991 level of 0.25 grams per horsepower-hour ("g/HP-hr") to 0.10 g/HP-hr. Although the oxidation catalysts of the present invention, when employed as a diesel exhaust treatment catalyst, are primarily concerned with effectuating a reduction in total particulates, they are also capable, with the optional addition of platinum in limited amounts of providing the added advantage of also oxidizing a portion of the HC and CO contained in the gaseous component of the diesel engine exhaust without promoting excessive oxidation of $SO_2$ to $SO_3$. The oxidation catalysts of the present invention avoid or reduce the unwanted side effect of promoting the oxidation of $SO_2$ to $SO_3$ which, as noted above, contributes to the particulates problem because the condensation of sulfuric acid and other sulfate condensibles which accumulate on, and add to, the mass of the particulates in the exhaust.

However, the oxidation catalysts of the present invention have utility for uses other than the treatment of diesel engine exhaust. Generally, the catalysts of the present invention are useful for oxidation of gas-borne oxidizeable components in engine exhausts generally, such as any application in which lubricating oils are discharged, e.g., the exhaust of compressed natural gas engines, ethanol-fueled engines, compressors, gas turbines, etc. Many alternate-fueled engines such as compressed natural gas engines are built on diesel engine carcasses and therefore inherently discharge significant quantities of lubricating oil.

In accordance with the teachings of the present invention it has been found, surprisingly, that the beneficial effect of oxidizing pollutants generally, and in particular of reducing diesel exhaust particulates emissions by oxidation of the volatile organic fraction thereof, can be attained by a mixture of high surface area, i.e., activated, alumina and a high surface area ceria, each having a BET surface area of 10 $m^2/g$ or higher. For purposes of illustration, the benefits of the present invention will be described in detail below with respect to the treatment of diesel engine exhaust. The basic and novel characteristics of the present invention are believed to reside in the use of the defined combination of ceria and alumina as an oxidation catalyst without the addition of metal catalytic components thereto, except as specifically otherwise defined in certain dependent claims. Preferably, the bulk ceria and the bulk alumina will each have a surface area of at least about 10 $m^2/g$, preferably at least about 20 $m^2/g$. For example, the bulk alumina may have a surface area of from about 120 to 180 $m^2/g$ and the bulk ceria may have a surface area of from about 70 to 150 $m^2/g$. The fact that a catalyst composition which can serve as a diesel oxidation catalyst and which contains activated alumina as a major component thereof has proven to be successful is in itself surprising, in view of the consensus of the prior art that alumina, if used at all in diesel oxidation catalysts, must be a low surface area alumina ($\alpha$-alumina) and/or be used in conjunction with sulfate-resistant refractory metal oxides such as zirconia, titania or silica. It has nonetheless been found that, in accordance with the present invention, surprisingly, a combination of high surface area alumina and a high surface area ceria provides a catalytic material which effectively catalyzes the oxidation of the volatile organic fraction so as to provide a significant reduction in total particulates in diesel engine exhaust and exhibits good durability, that is, long life, both in laboratory and diesel engine tests. It should be noted that the prior art generally considers refractory base metal oxides used in diesel oxidation catalysts to be merely supports for the dispersal thereon of catalytically active metals such as platinum group metals. In contrast, the present invention teaches that a ceria-alumina catalytic material comprising essentially only ceria and alumina of sufficiently high surface area (10 $m^2/g$ or higher), dispersed on a suitable carrier, provides a durable and effective diesel oxidation catalyst.

It has further been found that beneficial effects are attained by the optional incorporation of platinum in the catalyst composition, provided that the platinum is present at loadings much lower than those conventionally used in oxidation catalysts. It has been discovered that, most surprisingly, a limited quantity of platinum in the catalyst composition actually reduces the undesirable oxidation of $SO_2$ to $SO_3$ relative to that encountered by using the ceria-alumina catalytic material alone, while nonetheless promoting some oxidation of CO and HC gaseous components of the diesel exhaust. The suppression of the oxidation of $SO_2$ to $SO_3$ by the addition of low loadings of platinum is a very surprising finding, given the powerful catalytic activity of platinum in promoting oxidation reactions generally. Without wishing to be bound by any particular theory, it may be that the presence of a low loading of platinum on the ceria occupies some catalytic sites on the ceria, thereby moderating the tendency of ceria to promote the oxidation of $SO_2$ to $SO_3$. If the catalytic metal platinum is added to the catalytic composition, it serves to catalyze the oxidation of gas phase HC and CO pollutants as an added benefit. However, such catalytic metal is not needed to supplement the action of the ceria-alumina catalytic material in reducing total particulate emissions. The platinum catalytic metal does not appear to play a role in controlling particulates, as indicated by data discussed elsewhere herein, which show that the quantity of platinum utilized does not significantly affect the rate of particulates conversion.

The catalysts of the present invention may take the form of a carrier or substrate, such as a monolithic "honeycomb" structure (a body having a plurality of gas flow passages extending therethrough), on which is applied a coating of the catalytic material comprising a mixture of high surface area ceria and alumina and, optionally, a low loading platinum. As discussed below, discrete coatings of the ceria and alumina may be employed.

The Carrier (Substrate)

The carrier used in this invention should be relatively inert with respect to the catalytic composition dispersed thereon. The preferred carriers are comprised of ceramic-like materials such as cordierite, α-alumina, silicon nitride, zirconia, mullite, spodumene, alumina-silica-magnesia or zirconium silicate, or of refractory metals such as stainless steel. The carriers are preferably of the type sometimes referred to as honeycomb or monolithic carriers, comprising a unitary cylindrical body having a plurality of fine, substantially parallel gas flow passages extending therethrough and connecting both end-faces of the carrier to provide a "flow-through" type of carrier. Such monolithic carriers may contain up to about 700 or more flow channels ("cells") per square inch of cross section, although far fewer may be used. For example, the carrier may have from about 7 to 600, more usually from about 200 to 400, cells per square inch ("cpsi").

While this discussion and the following examples relate to flow-through type carrier substrates, wall-flow carriers (filters) may also be used. Wall-flow carriers are generally similar in structure to flow-through carriers, with the distinction that each channel is blocked at one end of the carrier body, with alternate channels blocked at opposite end-faces. Wall-flow carrier substrates and the support coatings deposited thereon are necessarily porous, as the exhaust must pass through the walls of the carrier in order to exit the carrier structure.

The Catalytic Material

The ceria-alumina catalytic material may be prepared in the form of an aqueous slurry of ceria and alumina particles, the particles optionally being impregnated with the platinum catalytic metal component if one is to be utilized. The slurry is then applied to the carrier, dried and calcined to form a catalytic material coating ("washcoat") thereon. Typically, the ceria and alumina particles are mixed with water and an acidifier such as acetic acid, nitric acid or sulfuric acid, and ball milled to a desired particle size.

The optional platinum catalytic metal component is, when used, preferably incorporated into the ceria particles or into the ceria and alumina particles. In such case, the ceria-alumina acts not only as a catalyst but also as a support for the optional platinum catalytic metal component. Such incorporation may be carried out after the ceria-alumina catalytic material is coated as a wash-coat onto a suitable carrier, by impregnating the coated carrier with a solution of a suitable platinum compound, followed by drying and calcination. However, preferably, the ceria particles or both the ceria and alumina particles are impregnated with a suitable platinum compound before a coating of the ceria-alumina catalytic material is applied to the carrier. In either case, the optional platinum metal may be added to the ceria-alumina catalytic material as, e.g., a solution of a soluble platinum compound, the solution serving to impregnate the ceria and alumina particles (or the ceria-alumina coating on the carrier), which may then be dried and the platinum fixed thereon. Fixing may be carried out by calcination or by treatment with hydrogen sulfide or by other known means, to render the metal in water-insoluble form.

Generally, the slurry of ceria and activated alumina particles, whether or not impregnated with the platinum compound solution, will be deposited upon the carrier substrate and dried and calcined to adhere the catalytic material to the carrier and, when the platinum compound is present, to revert the platinum compound to the elemental metal or its oxide. Suitable platinum compounds for use in the foregoing process include potassium platinum chloride, ammonium platinum thiocyanate, amine-solubilized platinum hydroxide and chloroplatinic acid, as is well-known in the art. During calcination, or at least during the initial phase of use of the catalyst, such compounds, if present, are converted into the catalytically active elemental platinum metal or its oxide.

When the catalytic material is applied as a thin coating to a suitable carrier, such as described above, the proportions of ingredients are conventionally expressed as weight of material per unit volume of catalyst, as this measure accommodates the presence of different sizes of catalyst composition voids provided by different carrier wall thicknesses, gas flow passages, etc. Grams per cubic inch ("g/in$^3$") units are used to express the quantity of relatively plentiful components such as the ceria-alumina catalytic material, and grams per cubic foot ("g/ft$^3$") units are used to express the quantity of the sparsely used ingredients, such as the platinum metal. For typical diesel exhaust applications, the ceria-alumina catalytic material of the present invention generally may comprise from about 0.25 to about 4.0 g/in$^3$, preferably from about 0.25 to about 3.0 g/in$^3$ of the coated carrier substrate, optionally including from about 0 to 25, preferably from about 0 to 15 g/ft$^3$ of platinum.

Without wishing to be bound by a particular theory, applicants offer the following hypothesis to explain the superior performance, when used to treat diesel engine exhaust, of the ceria-alumina catalytic materials according to this invention. It is believed that diesel exhaust contains a significant proportion of gases or vapors which are close to their dew point, i.e., close to condensing to a liquid, and thereby adding to the VOF portion of the particulates at the conditions obtaining in the exhaust pipe. These "potential particulates" condense in the ceria-alumina catalytic materials, their condensation being enhanced by a capillary condensation effect, a known phenomenon in which a capillary-like action facilitates condensation of oil vapors to liquid phase. The small pore size of the high surface area ceria-alumina catalytic material is believed to provide such capillary condensation action for the VOF. Generally, the higher the surface area of the ceria and alumina, the smaller is their pore size. As the exhaust temperature increases during increased work loads imposed on the diesel engine, the condensed hydrocarbon liquids (condensed VOF) are desorbed from the ceria-alumina catalytic material and volatilize, at which time the catalytic effect of the ceria-alumina catalytic material, which provides numerous acidic sites, is believed to enhance cracking and gas phase oxidation, i.e., combustion, of the desorbed, re-volatilized hydrocarbon (VOF) vapors. Even if a proportion of the vapors re-volatilized from the condensate is not combusted, the cracking of heavy VOF components to lighter hydrocarbons reduces the total amount of condensibles, so that the total particulates output from the diesel engine is concomitantly further reduced. In this latter regard, the ceria-alumina catalytic material is believed to act as a trap and a storage medium for condensed or condensible VOF during relatively cool phases of the exhaust, and releases the cracked VOF only upon re-volatilization thereof during relatively hot phases. The porous nature of the ceria-alumina catalytic material is also believed to promote rapid diffusion of the VOF throughout the washcoat structure, thereby facilitating relatively low temperature gasification and oxidation of the VOF upon increases in temperature of the catalyst during higher engine load (and therefore increased exhaust gas temperature) cycles. Data on aging show that the presence of sulfates does not significantly adversely affect the capacity of the ceria-alumina catalytic material to reduce particulate emissions.

Generally, other ingredients may be added to the catalyst composition of the present invention such as conventional thermal stabilizers for the alumina, e.g., rare earth metal oxides such as ceria. Thermal stabilization of high surface area ceria and alumina to militate against phase conversion to less catalytically effective low surface area forms is well-known in the art although thermal stabilization of alumina is not usually needed for diesel exhaust service. Such thermal stabilizers may be incorporated into the bulk ceria or into the bulk activated alumina, by impregnating the ceria (or alumina) particles with, e.g., a solution of a soluble compound of the stabilizer metal, for example, an aluminum nitrate solution in the case of stabilizing bulk ceria. Such impregnation is then followed by drying and calcining the impregnated ceria particles to convert the aluminum nitrate impregnated therein into alumina.

In addition, the catalyst compositions of the invention may contain other catalytic ingredients such as other base metal promoters or the like. However, in one embodiment, the catalyst composition of the present invention consists essentially only of the high surface area ceria and high surface area alumina, preferably present in a weight proportion of 1.5:1 to 1:1.5, with or without thermal stabilizers impregnated therein, and, optionally, limited amounts of platinum. With respect to the method aspect of the invention, the use of palladium in place of platinum is contemplated.

Examples and Data

A catalyst composition in accordance with one embodiment of the invention, in which an optional alumina undercoat is provided beneath a coating of the ceria-alumina catalytic material having a platinum metal dispersed thereon, was prepared as follows.

EXAMPLE 1

A. An activated alumina undercoat slurry is prepared by combining 1000 grams of activated alumina having a nominal BET surface area of 150 $m^2/g$ with 50 cubic centimeters ("cc") of glacial acetic acid and 1 cc of an antifoamant sold under the trademark NOPCO NXZ in 1000 cc of deionized water. The ingredients are ball milled until an average particle size of at least 90 percent by volume of the particles having a diameter of not greater than 12 microns is attained. Cylindrical carriers comprising cordierite cylinders 6 inches long by 6 inches in diameter and having 400 gas flow passages per square inch of end face area (400 cpsi) are dipped into the slurry, excess slurry is blown from the gas flow passages and the slurry-coated carriers are dried at 110° C. and then calcined in air at 450° C. for 1 hour to provide alumina-coated carriers.

B. The ceria-alumina catalytic material is prepared by utilizing 1050 grams of the same activated alumina as used in Part A and 900 grams of aluminum-stabilized ceria having a BET surface area of 164 $m^2/g$. The aluminum-stabilized ceria is attained by impregnating the ceria particles with a solution of an aluminum compound such as aluminum nitrate followed by calcining, to provide an aluminum content in the ceria of 1.35 weight percent aluminum, based on the total weight of ceria with the weight of aluminum calculated as the metal. Presumably, the aluminum is present as alumina. One such method of preparing an aluminum-stabilized ceria is shown in U.S. Pat. No. 4,714,694 issued Dec. 22, 1981 to C. Z. Wan et al, the disclosure of which, as noted above, is incorporated by reference herein. As is well-known, high surface area refractory oxides such as ceria are subject to loss of surface area and consequent reduction in catalytic efficiency upon prolonged exposure to high temperatures and other conditions of treating diesel exhausts.

Aluminum-stabilized ceria is more resistant to such thermal degradation than is unstabilized ceria. As is also well-known, alumina may also be thermally stabilized, usually by a similar impregnation of the alumina with precursors of rare earth metal oxides such as ceria. However, thermal stabilization of the alumina is usually not necessary for the temperatures encountered in treating diesel engine exhaust. The high surface area ceria and high surface area alumina particles are placed in separate ball mills. A quantity of an amine-solubilized platinum hydroxide solution containing 0.2894 grams of platinum, a quantity of monoethanolamine ("MEA"), 97.5 cc of glacial acetic acid, 2.0 cc of an anti-foamant sold under the trademark NOPCO NXZ and about 1950 cc of deionized water are employed. About one-half the water and sufficient MEA to adjust the pH to at least about 7 are placed in the ball mill containing the alumina which is milled to thoroughly blend the ingredients. Then, one-half of the platinum solution is added and ball milling is continued for about 5 minutes. Thereafter, about one-half the glacial acetic acid and anti-foamant are added and milling is continued until a particle size of at least about 90 percent by weight of the particles having a diameter of less than about 12 microns is attained. The same process is separately repeated with the aluminum-stabilized ceria, except that MEA is not employed, including ball milling for mixing and to attain the same particle size of the ceria particles. The alumina and ceria slurries are then blended together to form a slurry of alumina and ceria particles containing a platinum compound. The alumina-coated carrier obtained in Part A of this Example 1 is dipped into the blended slurry, excess slurry is blown from the gas flow passages of the carrier, and the coated carrier is then dried and calcined in air at 450° C. to provide a finished catalyst containing a coating of a ceria-alumina catalytic material having about 0.5 $g/ft^3$ of platinum dispersed thereon. The catalytic material coating, sometimes referred to as a washcoat, inclusive of the platinum content, comprises about 1.95 $g/in^3$ of the catalyst composition, the catalytic material overlying an alumina undercoat which comprises about 1.00 $g/in^3$ of the catalyst composition. Unless otherwise specified, catalyst samples in accordance with the present invention in subsequent Examples have the same type and loading of alumina undercoat and ceria-alumina catalytic material as a topcoat overlying the undercoat.

Reference in the following TABLES, or elsewhere in this application, to a percentage conversion of constituents (rendered as "%C" in the TABLES) of the exhaust or test gas, means the percentage of such constituent initially present in the exhaust or test gas being treated which is converted to another species, e.g., the conversion to $H_2O$ and/or $CO_2$ of HC, CO and VOF, and the oxidation to $SO_3$ of $SO_2$. Thus, if an exhaust contains 10 volume percent CO and treatment of the exhaust results in an outlet gas containing 6 volume percent CO, a 40 percent conversion of the CO has been attained. Reference in the following Examples, or elsewhere in this application, to "space velocity" means the flow rate of exhaust or test gas flowed through a catalyst, expressed as volumes of exhaust or test gas per volume of catalyst per hour, calculated with the exhaust or test gas at standard conditions of temperature and pressure.

EXAMPLE 2

A series of sample catalysts was prepared generally in accordance with the procedures of Example 1 to provide a series of five otherwise identical compositions containing a ceria-alumina catalytic material in accordance with the teachings of the present invention, having various amounts of platinum dispersed thereon, including 0, 0.5, 1.0, 2.0 and 5.0 g/ft$^3$ of platinum. These catalyst samples comprised cores measuring 1.5 inches in diameter and 3.0 inches in length, cut from cordierite carriers 6 inches long and 6 inches in diameter, used, as in Example 1, to make the catalysts of this Example 2. The resulting 400 cpsi cordierite sample cores contained a loading of 1.95 g/in$^3$ of the ceria-alumina catalytic material overlying an alumina undercoat present in the amount of 1.00 g/in$^3$ in addition to the specified loading of platinum metal dispersed on the ceria-alumina catalytic material. The test catalysts were aged for 10 hours at 500° C. by having a mixture of 10 percent steam in air flowed through them. A test gas was contacted with each of these aged catalysts in a series of tests at a space velocity of 50,000 and inlet temperature of, respectively, 275° C., 350° C., 425° C. and 500° C. The test gas had a composition of 10 percent steam, 10 percent oxygen, 4.5 percent $CO_2$, 1000 ppm NO, 28.6 ppm heptane, 200 ppm CO, 50 ppm $SO_2$, balance nitrogen. All percents are volume percent and "ppm" means parts per million by volume. Measurements were taken to determine the amount of oxidation of $SO_2$ to $SO_3$. The results of these tests are tabulated in TABLE I below and plotted in FIG. 1.

TABLE I

| Inlet Gas Temp. (°C.) | Platinum Loading (g/ft$^3$) | % C$^a$ $SO_2$ | % C$^a$ HC | % C$^a$ CO |
|---|---|---|---|---|
| 275 | 0   | 8.0  | 0.0  | 0.0  |
| 275 | 0.5 | 0.0  | 2.4  | 30.5 |
| 275 | 1.0 | 6.1  | 0.0  | 74.6 |
| 275 | 2.0 | 16.0 | 10.0 | 99.0 |
| 275 | 5.0 | 30.6 | 20.2 | 99.5 |
| 350 | 0   | 8.0  | 0.0  | 5.9  |
| 350 | 0.5 | 4.0  | 9.8  | 68.3 |
| 350 | 1.0 | 17.6 | 31.7 | 97.9 |
| 350 | 2.0 | 21.6 | 87.8 | 100  |
| 350 | 5.0 | 30.0 | 83.1 | 100  |
| 425 | 0   | 12.0 | 2.6  | 10.3 |
| 425 | 0.5 | 11.8 | 31.6 | 84.3 |
| 425 | 1.0 | 25.5 | 66.6 | 96.4 |
| 425 | 2.0 | 33.3 | 90.5 | 100  |
| 425 | 5.0 | 48.0 | 91.9 | 100  |
| 500 | 0   | 20.0 | 9.3  | 9.3  |
| 500 | 0.5 | 12.0 | 47.4 | 84.8 |
| 500 | 1.0 | 28.8 | 80.5 | 98.5 |
| 500 | 2.0 | 35.3 | 83.1 | 99.5 |
| 500 | 5.0 | 62.0 | 88.0 | 100  |

$^a$"% C" means the percentage conversion of the indicated constituent.

The data of TABLE I, and the plot thereof in FIG. 1, clearly show that the ceria-alumina catalytic material containing no platinum in each case provided, at each temperature level tested, a somewhat higher degree of conversion of $SO_2$ to $SO_3$ than did the otherwise identical ceria-alumina catalyst containing 0.5 g/ft$^3$ of platinum. As the platinum loading was increased to 1.0 g/ft$^3$, at each temperature level, the degree of undesired conversion of $SO_2$ to $SO_3$ increased as compared to the versions containing no or only 0.5 g/ft$^3$. Further increases in platinum loading to 2 and 5 g/ft$^3$ further increased, as one would expect, the oxidation of $SO_2$. What is very surprising is the fact, clearly shown in FIG. 1 and the data of TABLE I, that the ceria-alumina catalytic material containing 0.5 g/ft$^3$ of platinum dispersed thereon demonstrated less conversion of $SO_2$ to $SO_3$ than did the ceria-alumina catalytic material containing no platinum metal thereon. As noted above, it is believed that the presence of a low loading of platinum on the ceria may occupy some catalytic sites which otherwise are highly effective in promoting the oxidation of $SO_2$ to $SO_3$.

Figure 2:
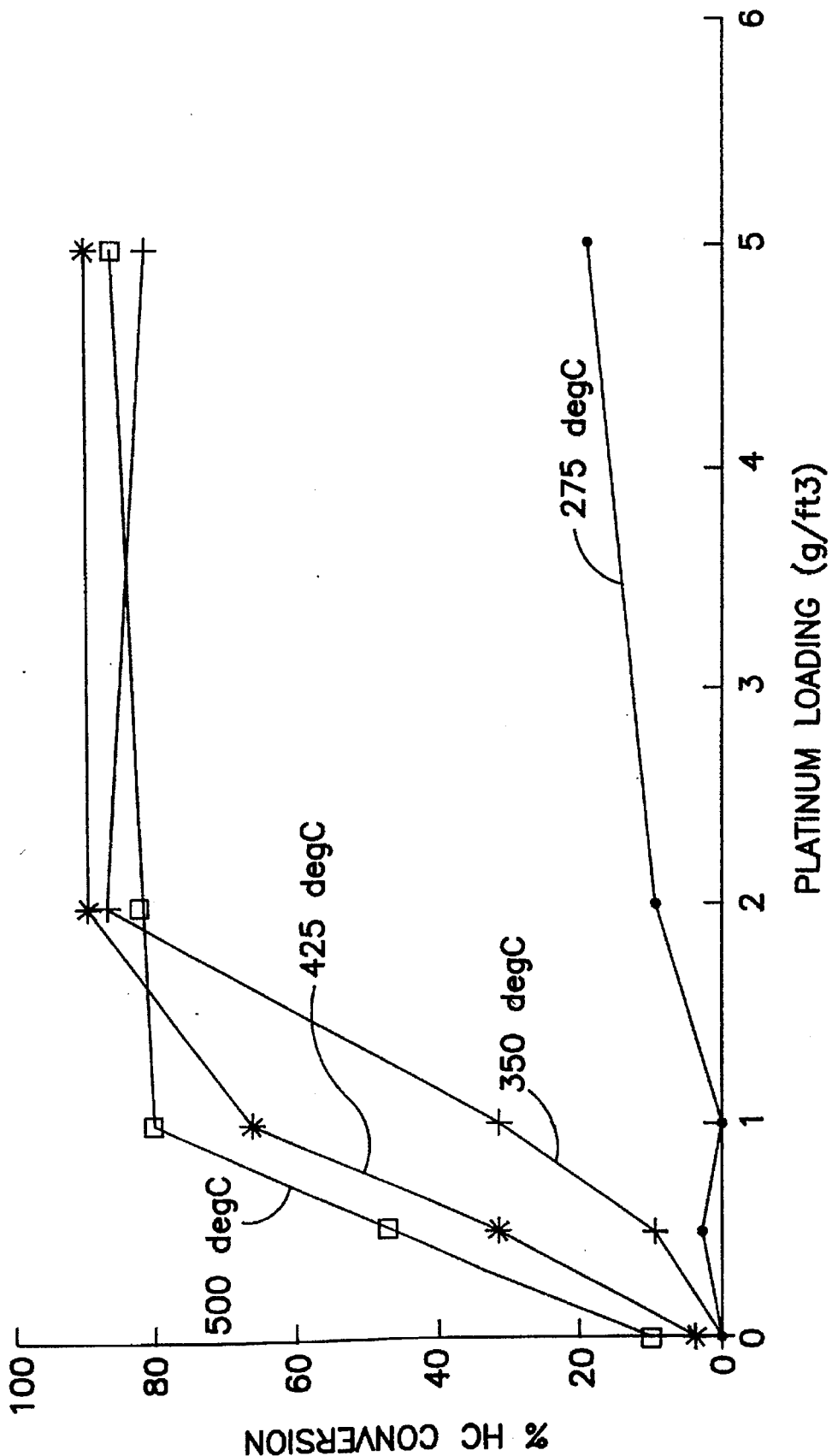
FIG. 2 is a plot similar to that of FIG. 1 but showing the degree of HC oxidation on the ordinate versus platinum loading on the abscissa.

FIG. 2 shows the corresponding conversion of hydrocarbons in the test gas at the various temperature levels tested.

The HC and CO conversion data of TABLE I, and the plot of the HC conversion data of TABLE I in FIG. 2, show the expected result that as the content of platinum metal increases the degree of conversion of HC and CO likewise increases. As discussed elsewhere herein, because of successful modifications in diesel engine design, catalytic treatment of diesel exhaust may not be necessary in order to attain reductions in HC and CO to meet U.S. Government standards, because the modified engines have reduced the output of HC and CO to below that of the current and impending U.S. Government standards. Nonetheless, the inclusion of platinum, at least at a loading of not more than about 1 g/ft$^3$, preferably at from about 0.1 to 0.8 g/ft$^3$, more preferably at about 0.5 g/ft$^3$, is seen to have a beneficial effect on reducing the amount of oxidation of SO to SO. Thus limited, the addition of platinum is seen to reduce $SO_2$ oxidation and thereby ameliorate particulates emissions. The addition of platinum also provides a beneficial added effect of further reducing HC and CO emissions.

It will be appreciated that in some cases it may be desired or necessary to significantly reduce HC and/or CO emissions and, in order to do so, the addition of moderate amounts of platinum, not more than 15 g/ft$^3$, preferably not more than 5 g/ft$^3$, and most preferably not more than 2 g/ft$^3$, may be desirable despite the concomitant increase in $SO_2$ oxidation at additions of significantly more than 0.5 g/ft$^3$.

EXAMPLE 3

A series of test catalysts was prepared generally in accordance with the procedure outlined in Example 1 to provide three samples, each comprising an alumina undercoat at a loading of 1.0 g/in$^3$ upon which was coated a topcoat layer comprised of a ceria-alumina catalytic material containing ceria and alumina in proportions of 46.2 weight percent aluminum-stabilized ceria and 53.8 weight percent alumina, and having dispersed thereon 0.5 g/ft$^3$ of platinum. The ceria-alumina topcoat layer was present in the amount of 1.95 g/in$^3$. The ceria had a surface area of about 164 m$^2$/g and the alumina had a surface area of about 150 m$^2$/g. One sample, designated S-3Ce, has the platinum dispersed only on the ceria component of the catalytic material, a second sample designated S-3 has equal amounts of the platinum dispersed on the ceria and the alumina components of the ceria-alumina catalytic material, and the third sample, designated S-3A1, has the platinum disposed entirely on the alumina component of the ceria-alumina catalytic material. The three catalyst samples were then tested for HC, CO and $SO_2$ conversion at 350° C. and a space velocity of 90,000. The results are shown in TABLE II below.

TABLE II

| Sample | % C$^a$ CO | % C$^a$ HC | % C$^a$ $SO_2$ |
|---|---|---|---|
| S-3Ce | 80.2 | 37.5 | 4.1 |
| S-3   | 49.3 | 7.55 | 4.6 |
| S-3A1 | 94.9 | 56.5 | 8.0 |

$^a$"% C" means the percentage conversion of the indicated constituent.

The data of TABLE II clearly indicate that the platinum is a more effective oxidation catalyst for HC and CO when dispersed on the alumina (S-3A1) as compared to when it is dispersed on the ceria (S-3Ce) and is much more effective in this regard than is the S-3 sample, wherein the platinum is dispersed equally on each of the ceria and alumina components. Overall, the best results were obtained with the S-3Ce sample in which fairly high levels of desired conversion of CO and HC were attained and the lowest level (4.1%) of the undesired oxidation of $SO_2$ to $SO_3$ was also attained. S-3 catalyst provided significant, but lesser, conversions of CO and HC and only slightly more (4.6%) of the undesired oxidation of $SO_2$ than did S-3Ce, but was much better in terms of less promotion of oxidation of $SO_2$ than was the S-3A1 sample (8.0%). TABLE II thus demonstrates the desirability of dispersing all or at least a part of the platinum metal component on the ceria component of the ceria-alumina catalytic material.

EXAMPLE 4

A series of catalyst samples was prepared generally according to the procedures of Example 1 to provide an alumina undercoat at a loading of 1.0 g/in$^3$ on which a metal oxide topcoat was coated. In the case of comparative sample Comp. 1, the topcoat contained no ceria, the topcoat of comparative sample Comp. 2 contained no alumina, and, in a third sample in accordance with the present invention, S-3, the topcoat comprised a ceria-alumina catalytic material containing 46.2 percent ceria and 53.8 weight percent alumina. Each of the samples contained 0.5 g/ft$^3$ of platinum and had a topcoat loading of about 1.95 g/in$^3$, inclusive of the platinum. In all cases the ceria had a surface area of 150 m$^2$/g and the alumina had a surface area of 150 m$^2$/g. The samples were tested with the same test gas as described in Example 2 at 275° C., 350° C., 425° C. and 500° C., and the conversion of HC, CO and oxidation of $SO_2$ to $SO_3$ at a space velocity of 50,000 was measured. The results of these tests are summarized in TABLE III.

TABLE III

| Inlet Gas Temp. (°C.) | Sample No. | % C $SO_2$ | % C HC | % C CO |
| --- | --- | --- | --- | --- |
| 275 | Comp. 1 | 16.3 | 10.0 | 96.6 |
| 275 | S-3 | 0.0 | 2.4 | 30.5 |
| 275 | Comp. 2 | 10.2 | 0.0 | 9.4 |
| 350 | Comp. 1 | 18.9 | 86.5 | 99.6 |
| 350 | S-3 | 4.0 | 9.8 | 68.3 |
| 350 | Comp. 2 | 12.2 | 6.5 | 63.1 |
| 425 | Comp. 1 | 35.5 | 90.5 | 99.9 |
| 425 | S-3 | 11.8 | 31.6 | 84.3 |
| 425 | Comp. 2 | 22.4 | 18.2 | 70.4 |
| 500 | Comp. 1 | 42.2 | 83.7 | 99.7 |
| 500 | S-3 | 12.0 | 47.4 | 84.8 |
| 500 | Comp. 2 | 32.0 | 31.6 | 61.0 |

Figure 3:
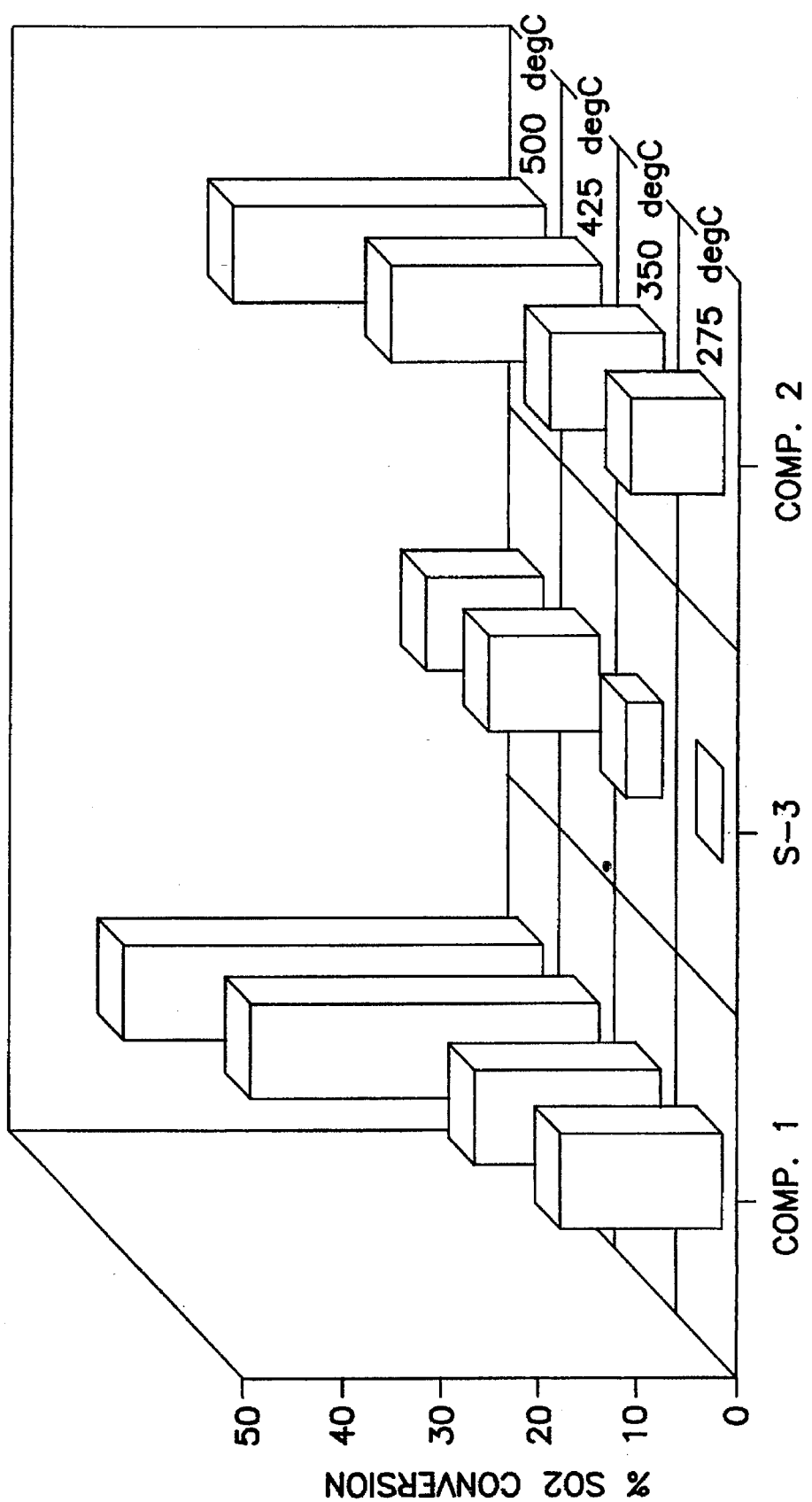
FIG. 3 is a perspective plot of oxidation of $SO_2$ to $SO_3$ in a gas stream being treated with an oxidation catalyst, with the degree of oxidation indicated by the height of the vertical bars for three different samples, each containing 0.5 g/ft$^3$ of platinum and having different weight percentages of ceria in the ceria-alumina catalytic material.

The data of TABLE III indicate the conversion of hydrocarbons (HC) was highest for sample Comp. 1, containing 100 percent alumina and no ceria, and lowest for sample Comp. 2, containing 100 percent ceria and no alumina. The catalyst in accordance with the present invention, S-3, provided intermediate levels of conversion of HC. Comparable results were obtained for conversion of CO at all temperature levels. The results of TABLE III concerning the conversion of $SO_2$ to $SO_3$ are shown in the perspective-view plot of FIG. 3 from which it is readily seen that at each temperature level tested a lower degree of conversion of $SO_2$ was attained by the S-3 sample in accordance with an embodiment of the present invention, than was attained with either the 100 percent alumina (Comp. 1) version or the 100 percent ceria (Comp. 2) version. These data demonstrate that utilizing a ceria-alumina catalytic material in accordance with the present invention reduces the oxidation of $SO_2$ as compared to either a 100 percent ceria or 100 percent alumina catalyst containing 0.5 g/ft$^3$ of platinum. A series of catalyst compositions was prepared in order to test catalyst compositions in accordance with the present invention against comparative catalyst compositions containing various refractory metal oxides and catalytic metals. These catalysts were tested both on a laboratory diagnostic reactor and on diesel engines. The two test engines employed were a Cummins 6BT engine, rated at 190 horsepower and having a 5.9 liter displacement and a Caterpillar 3176 engine, rated at 325 horsepower and having a 10.3 liter displacement. The operating characteristics of these two engines are shown in TABLE IV based on the operating cycle used to test the catalyst composition samples.

TABLE IV

| Temperature (°C.) | Caterpillar 3176 Temp. Cycle[a] | Cummins 6BT Temp. Cycle[a] |
| --- | --- | --- |
| less than 100 | 0 | 0 |
| 100–200 | 0 | 62.6 |
| 200–300 | 57.3 | 36.7 |
| 300–400 | 30.9 | 0.7 |
| 400–500 | 11.8 | 0 |
| Maximum Temperature (°C.): | 475 | 305 |

| | g/HP-hr[b] | Wt. %[c] | g/HP-hr[b] | Wt. %[c] |
| --- | --- | --- | --- | --- |
| Particulates: | | | | |
| VOF | 0.036 | 21.6 | 0.066 | 38.4 |
| Sulfate | 0.005 | 3.1 | 0.003 | 2.0 |
| Carbon/Other[d] | 0.127 | 75.3 | 0.103 | 59.6 |
| Totals | 0.168 | 100.0 | 0.172 | 100.0 |
| Gas Phase: | | | | |
| HC | 0.123 | — | 0.300 | — |
| CO | 3.48 | — | 1.50 | — |
| NO$_x$ | 5.06 | — | 4.34 | — |

[a]Percentage of cycle time at which the inlet exhaust to the catalyst lies within the indicated temperature range
[b]"g/HP-hr" = grams per brake horsepower-hour of component emitted in exhaust
[c]Weight percentage of total particulates provided by the indicated constituent
[d]"Carbon/Other" values are calculated by difference between the measured VOF and sulfate components of the exhaust and the total exhaust particulates. Carbon/Other comprises the dry, solid carbonaceous content of the particulates plus any water associated with the sulfates. Any measurement errors will affect the "Carbon/Other" value.

As shown in TABLE IV, the Cummins engine runs with a cooler exhaust than does the Caterpillar engine and the total engine emissions are roughly comparable although the Cummins engine runs richer in the volatile organic fraction (VOF) which is the component most effectively treated by the diesel oxidation catalyst of the present invention.

EXAMPLE 5

A series of catalyst samples was prepared generally by the method disclosed in Example 1 including two catalysts, designated samples S-3 and S-3B, comprising embodiments of the present invention and made exactly in accordance with Example 1 except that for sample S-3B palladium was substituted for platinum by using palladium nitrate as the source of the catalytic metal. Samples S-3 and S-3B each had an alumina undercoat at a loading of 1.0 g/in$^3$ and a topcoat of the ceria-alumina coating at a loading of 1.95 g/in$^3$. A series of comparative catalysts designated Comp.4, Comp.4M, Comp.4B, Comp.7, Comp.2.3, Comp.6 and Comp.5 were made by procedures comparable to those used in Example 1, with the following differences. The comparative catalysts were made without an alumina undercoat and, of course, using different refractory metal oxides as indicated by their respective compositions. For the samples containing niobia-silica (Comp.4, 4M, 4B and 7) the niobia was provided by dissolving niobium oxalate in the coating slurry. Further, the foamed α-alumina ("FAA") of Comp.2.3 and the silica of other comparative samples were not ball milled but were dry-jet milled and then incorporated into the coating step by use of a high speed intensive mixer. The vanadia-titania of sample Comp.6 was incorporated into a slurry containing palladium nitrate as the catalytic metal source.

The silica employed in each case except Comp.2.3 was an extremely porous silica designated PQ-1022 by its manufacturer, PQ Corporation. The PQ-1022 silica has a porosity of 1.26 cc/g pore volume comprised of pores having a radius of from about 10 to 300 Angstroms, and a surface area of 225 m²/g. The high porosity of the silica accounts for the relatively low weight loadings of the silica-containing washcoats. A silica sol was used for the Comp.2.3 sample as described in footnote c of TABLE V. Each of these catalysts, the general composition of which is set forth in TABLE V, was prepared as a slurry of the refractory metal oxide or oxides indicated in TABLE V which had been impregnated with the specified loading of catalytic metal and then coated onto 400 cpsi cylindrical cordierite honeycomb carriers manufactured by NGK and measuring 9 inches in diameter by 6 inches in length, providing a catalyst volume of 6.25 liters.

TABLE V

| Catalyst Sample | Washcoat | Metal | Metal Loading g/ft³ | Hours Aged 24 | Hours Aged 100 |
|---|---|---|---|---|---|
| S-3 | Ceria-Alumina | Pt | 0.5 | X | X |
| Comp. 4 | Niobia-Silica[a] | Pd | 50.0 | X | X |
| Comp. 4M | Niobia-Silica[a] | Pd—Pt | 25-5 | X | X |
| S-3B | Ceria-Alumina | Pd | 50.0 | X | X |
| Comp. 4B | Niobia-Silica[a] | Pt | 0.5 | X | |
| Comp. 7 | MnO-Niobia-Silica[b] | Pt | 2.2 | X | |
| Comp. 2.3[c] | Silica-FAA[d] | Pt | 2.2 | X | |
| Comp. 6 | Vanadia-Titania[e] | Pd | 27 | X | X |

[a]The niobia-silica sample catalysts (Comp. 4, 4M and 4B) had washcoats comprised of 10 percent by weight niobia and 90 percent by weight silica, with a total washcoat loading of 0.8 g/in³.
[b]The MnO-niobia-silica sample catalyst (Comp. 7) had a washcoat comprised of 90 percent by weight silica, 4 percent by weight niobia and 6 percent by weight MnO, with a total washcoat loading of 0.6 g/in³.
[c]The silica-foamed α-alumina sample catalyst (Comp. 2.3) had a washcoat comprised of 10 percent by weight silica sol binder and 90 percent by weight of foamed α-alumina ("FAA"), with a total washcoat loading of 0.6 g/in³. The α-alumina has a porosity of 0.0439 cc/g pore volume comprised of pore-shaving a radius of from about 10 to 300 Angstroms, and a surface area of 20.3 m²/g.
[d]"FAA" = foamed α-alumina
[e]The vanadia-titania sample catalyst (Comp. 6) had a washcoat comprised of 4 percent by weight vanadia and 96 percent by weight titania, with a total washcoat loading of 1.8 g/in³.

All eight sample catalysts were evaluated on the Cummins 6BT engine employing the U.S. Transient Cycle (commonly, and sometimes hereinbelow, referred to as the "Federal Test Procedure" or "FTP"). A description of the U.S. Transient Cycle is set forth in the Code of Federal Regulations, Title 40, Chapter 1, Subpart N, Paragraphs 86: 1310–88 and 86: 1312–88, Appendix I(f)(2). The catalyst volume-to-engine displacement ratio was 1.06. The catalysts were evaluated for fresh activity (after 24 hours aging) following which the five indicated samples were aged for 100 hours and further evaluated. All catalysts were aged on a 1986 Cummins NTC diesel engine rated at 400 horsepower and having a 14.0 liter displacement. The aging cycle employed flowed the engine exhaust through three catalysts of 6.25 liter volume each, simultaneously and in parallel, with the engine load adjusted to provide fifteen minute cycles during which the exhaust attained inlet temperatures as follows for the indicated amount of time:

330–400° C. for 14% of the time,

400–500° C. for 22% of the time,

500–550° C. for 50% of the time, and

550–565° C. for 14% of the time.

The S-3 and S-3B samples each contain 46.2 weight percent aluminum-stabilized ceria and 53.8 weight percent alumina.

TABLE VI shows the results of the fresh (aged 24 hours) catalyst samples tested under the Federal Test Procedure on the Cummins 6BT engine with all recorded exhaust emissions being given in grams per brake horsepower-hour. All emissions are measured quantities except for "Carbon+ Other" which is calculated by difference. The measured values are the average of four different runs conducted under the Federal Test Procedure which were carried out over the space of two days in order to account for day-to-day variations. TABLE VI also shows the base line values of the diesel exhaust operated without catalytic treatment over an average of 24 runs. The difference between the runs carried out without catalytic treatment and the runs carried out using the various catalyst samples were utilized to calculate the percent conversion of each of the emissions components. The percent conversion is the percentage of the emissions contained in the untreated exhaust which were converted to innocuous components by utilization of the catalyst samples. The abbreviation "TPM" is used for "total particulate matter".

TABLE VI

| Catalyst Sample | HC | CO | NOx | TPM | VOF | Sulfate | Carbon + Other |
|---|---|---|---|---|---|---|---|
| None - Untreated engine exhaust | | | | | | | |
| Grams[a] | 0.299 | 1.5 | 4.34 | 0.172 | 0.0611 | 0.0034 | 0.108 |
| S-3 | | | | | | | |
| Grams[a] | 0.188 | 1.11 | 4.3 | 0.118 | 0.0256 | 0.0016 | 0.0908 |
| % C[b] | 37.4 | 26 | 0.96 | 31.7 | 58.1 | 53.1 | 15.9 |
| Comp. 4 | | | | | | | |
| Grams | 0.198 | 1.28 | 4.22 | 0.123 | 0.0272 | 0.0022 | 0.0936 |

TABLE VI-continued

| Catalyst Sample | HC | CO | NOx | TPM | VOF | Sulfate | Carbon + Other |
|---|---|---|---|---|---|---|---|
| % C Comp. 4M | 34.1 | 14.9 | 2.7 | 28.8 | 55.4 | 37 | 13.3 |
| Grams | 0.213 | 1.34 | 4.22 | 0.123 | 0.0302 | 0.0025 | 0.0903 |
| % C S-3B | 29.1 | 11 | 2.8 | 28.8 | 50.6 | 28.2 | 16.4 |
| Grams | 0.155 | 1.31 | 4.31 | 0.118 | 0.0258 | 0.0025 | 0.0897 |
| % C Comp. 4B | 48.3 | 13 | 0.73 | 31.7 | 57.7 | 26 | 16.9 |
| Grams | 0.208 | 1.17 | 4.27 | 0.128 | 0.0359 | 0.0033 | 0.0888 |
| % C Comp. 7 | 30.7 | 22.2 | 1.5 | 25.9 | 41.2 | 4.8 | 17.8 |
| Grams | 0.198 | 1.09 | 4.31 | 0.135 | 0.0378 | 0.0028 | 0.0944 |
| % C Comp. 2.3 | 34.1 | 27.2 | 0.79 | 21.5 | 38.1 | 17.2 | 12.6 |
| Grams | 0.185 | 1.09 | 4.34 | 0.135 | 0.0306 | 0.0049 | 0.0995 |
| % C Comp. 6 | 38.2 | 27.5 | 0.1 | 21.5 | 38.1 | −43.6 | 7.9 |
| Grams | 0.135 | 1.51 | 4.35 | 0.118 | 0.0255 | 0.003 | 0.0895 |
| % C | 54.9 | −0.3 | −0.25 | 31.7 | 58.3 | 11.4 | 17.1 |

[a] Grams per brake horsepower-hour
[b] "% C" means the percentage conversion of the indicated constituent. A negative % C means the treated exhaust contained more of the constituent than did the untreated exhaust.

The results tabulated in TABLE VI indicate that with respect to VOF conversion and total particulates conversion, the best results were obtained by S-3, S-3B and Comp.6 catalysts, with the Comp.4 sample giving the next best results. As to sulfate emissions, the Comp.2.3 sample exhibited sulfate emissions which were greater than those of the untreated exhaust, all the other samples tested giving at least some reduction in sulfates as compared to the untreated exhaust. This finding is consistent with the relatively low temperature of the Cummins 6BT engine. With respect to gas phase emissions (HC, CO and NO$_x$) Comp.6, S-3B and Comp.5 gave the best HC reduction while Comp.2.3, Comp.7 and S-3 gave the best CO conversion. There was little catalytic effect on NO$_x$ emissions as one would expect in the relatively oxygen-rich environment of a diesel exhaust.

EXAMPLE 6

As indicated in TABLE V, five of the catalysts tested were then aged to a total of 100 hours and re-evaluated on the Cummins 6BT engine. The results of the evaluation of the 100-hour aged samples are summarized in TABLE VII.

TABLE VII

| Catalyst Sample | HC | CO | NOx | TPM | VOF | Sulfate | Carbon + Other |
|---|---|---|---|---|---|---|---|
| None - Untreated engine exhaust | | | | | | | |
| Grams[a] | 0.305 | 1.55 | 4.46 | 0.179 | 0.0675 | 0.0039 | 0.108 |
| S-3 | | | | | | | |
| Grams[a] | 0.188 | 1.27 | 4.31 | 0.123 | 0.0284 | 0.0018 | 0.0928 |
| % C[b] | 38.4 | 17.9 | 3.3 | 31.3 | 57.9 | 53.8 | 14.1 |
| Comp. 4 | | | | | | | |
| Grams | 0.218 | 1.47 | 4.37 | 0.128 | 0.0327 | 0.0023 | 0.093 |
| % C | 28.5 | 4.9 | 1.9 | 28.5 | 51.6 | 41 | 13.9 |
| Comp. 4M | | | | | | | |
| Grams | 0.238 | 1.49 | 4.37 | 0.13 | 0.0349 | 0.0031 | 0.092 |
| % C | 22 | 3.6 | 1.9 | 27.4 | 48.3 | 20.5 | 14.8 |
| S-3B | | | | | | | |
| Grams | 0.175 | 1.27 | 4.38 | 0.12 | 0.0282 | 0.0022 | 0.0896 |
| % C | 42.6 | 17.9 | 1.7 | 33 | 58.2 | 43.6 | 17 |

TABLE VII-continued

| Catalyst Sample | HC | CO | NOx | TPM | VOF | Sulfate | Carbon + Other |
|---|---|---|---|---|---|---|---|
| Comp. 6 | | | | | | | |
| Grams | 0.22 | 1.69 | 4.42 | 0.14 | 0.0308 | 0.0042 | 0.105 |
| % C | 27.9 | –9.3 | 0.8 | 21.8 | 54.4 | –7.7 | 2.8 |

[a]Grams per brake horsepower-hour
[b]"% C" means the percentage conversion of the indicated constituent. A negative % C means the treated exhaust contained more of the constituent than did the untreated exhaust.

Table VII shows that the best results were attained by the S-3 and S-3B catalysts for both total particulate emissions and VOF conversion. With respect to HC reduction the best performance was shown by S-3B although the S-3 catalyst proved to be the most stable, the results attained by the S-3 catalyst after 100 hours aging being actually better than those attained by the 24-hour aged S-3 sample. The S-3B catalyst exhibited improved CO conversion for the 100-hour aged catalyst as compared to the fresh (24-hour aged) catalyst. Note that the Comp.6 sample removed essentially no CO at 24 hours and became a net CO producer after being aged for 100 hours. The results of TABLE VI and VII clearly show that the catalyst compositions of the present invention, S-3 and S-3B, gave the best overall emissions control and the best durability as evidenced by 100 hours of aging.

EXAMPLE 7

In order to compare the effect of different catalytic metal loadings on the performance of catalysts in accordance with the present invention, three sample catalysts in accordance with the present invention were prepared in accordance with the procedure of Example 1. Thus, each catalyst comprised a cordierite 400 cpsi substrate containing 1.95 g/in$^3$ of the ceria-alumina catalytic material of the invention. The ceria-alumina catalytic material contained 46.2 weight percent of aluminum-stabilized ceria and 53.8 weight percent of activated alumina. Each catalyst had an alumina undercoat in the amount of 1.00 g/ft$^3$ onto which the ceria-alumina catalytic material was coated. One sample, designated S-3.5Pt had 0.5 g/ft$^3$ of platinum dispersed thereon, another sample, designated S-3.20Pt had 2.0 g/ft$^3$ of platinum dispersed thereon and a third sample, designated S-3Pd had 50 g/ft$^3$ of palladium dispersed thereon. Each catalyst was tested under the Federal Test Procedure to treat an exhaust generated by a Cummins C-series 250 HP diesel engine having a displacement of 8 liters, so that a catalyst volume-to-engine displacement ratio of 0.78 was utilized. The effectiveness of the sample catalyst was tested in the same manner as that of Example 6 and the results with respect to conversion of total particulates (TPM) and gaseous phase HC and CO are set forth in TABLE VIII.

TABLE VIII

| Sample | % C[a] TPM | % C[a] HC | % C[a] CO |
|---|---|---|---|
| S-3.5Pt | 47 | 28 | 7.5 |
| S-3.20Pt | 48 | 69 | 74 |
| S-3Pd | 48 | 52 | 35 |

[a]"% C" means the percentage conversion of the indicated constituent.

The data of TABLE VIII show that all three samples were nearly identical with respect to the percentage conversion of total particulates although the larger loadings of catalytic metal made a dramatic difference in the percentage conversions of the gaseous HC and CO. These results are consistent with the data of Example 6 and TABLE VII, from which it will be noted that S-3 and S-3B gave substantially similar results with respect to total particulates reduction in spite of the fact that S-3 contains only 0.5 g/ft$^3$ of platinum and S-3B contains 50 g/ft$^3$ of palladium. The lack of pronounced effect on total particulate reduction between a catalyst containing 100 times more platinum group metal than another, strongly suggests the irrelevancy of the presence of the catalytic metal insofar as total particulate reduction is concerned, and that particulate reduction is attained by the effect of ceria-alumina catalytic material.

EXAMPLE 8

Figure 4:
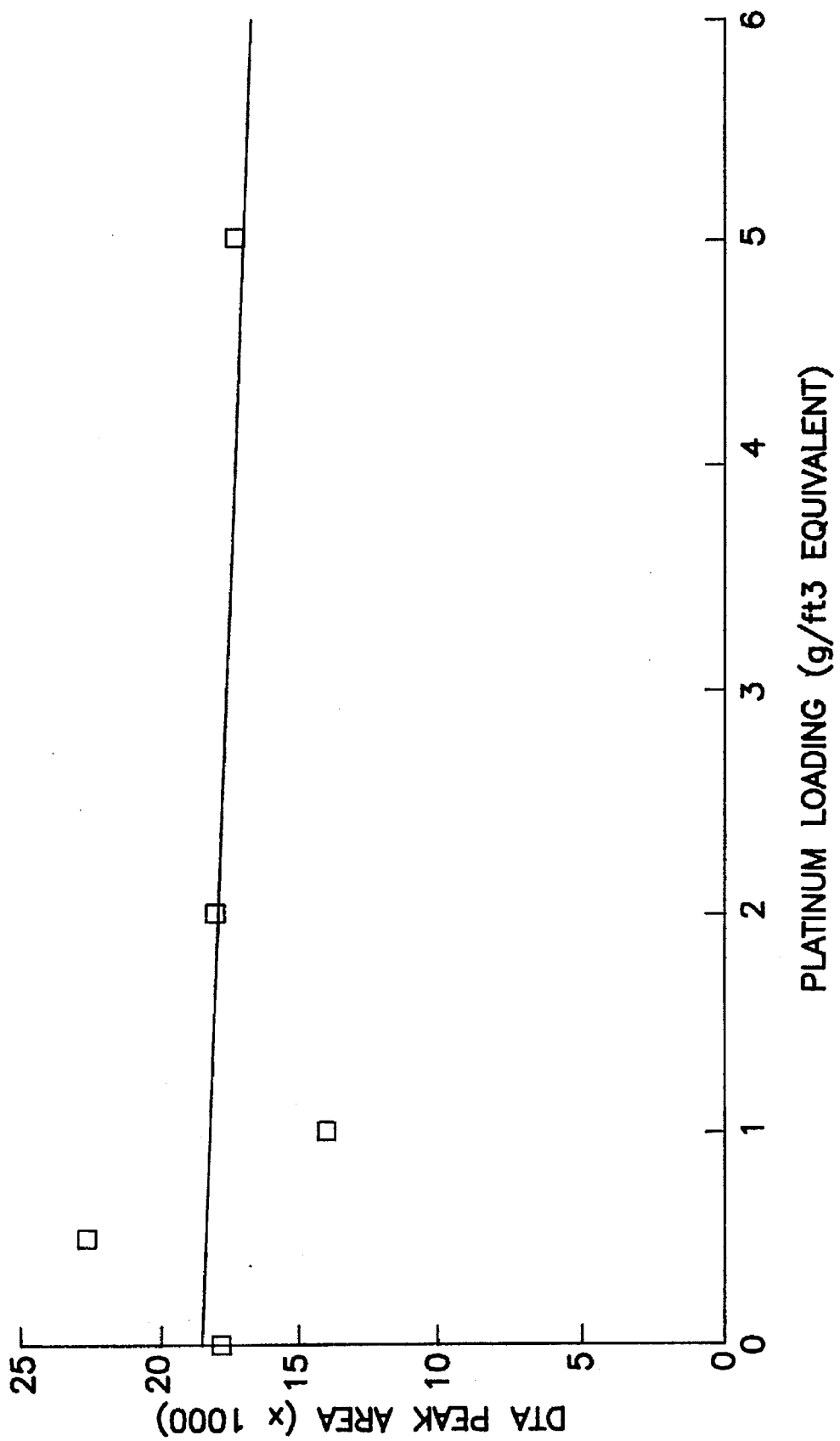
FIG. 4 is a plot of a factor (DTA peak area) correlating combustion of engine lubricating oil (simulating the unburned lubricating oil in "VOF", described below) plotted on the ordinate versus the platinum content of a ceria-alumina washcoat used to catalyze the combustion of the lubricating oil plotted on the abscissa.

In order to further demonstrate the irrelevancy of the platinum metal loading insofar as catalytic activity of the ceria-alumina catalytic material with respect to total particulate reduction is concerned, a series of samples of catalytic material powder was prepared. This was done by utilizing the ceria-alumina washcoat material of Example 7 containing various quantities of platinum metal ranging from 0 to the equivalent of 5.0 g/ft$^3$ of platinum if the washcoat were to be coated upon a 400 cpsi NGK cordierite substrate. The resultant series of powders were each mixed with 10 weight percent of a diesel engine lubricating oil, Cummins SAE-15W Premium Blue Diesel Engine Lube Oil, and the sample of the mixture was evaluated by simultaneous thermogravimetric analysis and differential thermal analysis (TGA/DTA) for combustion of the lubricating oil. It should be noted that unburned diesel engine lubricating oil constitutes a significant portion of the volatile organic fraction (VOF) of diesel exhaust particulate emissions and the efficacy of the ceria-alumina catalytic material in catalyzing combustion of the lubricating oil is a good indication of the effectiveness of the ceria-alumina catalytic material in catalyzing oxidation of VOF and, thereby, reduction of particulate emissions. Thermogravimetric analysis measures the weight gain or loss of a sample (indicating a chemical reaction undergone by the sample) as a function of the temperature to which the sample is heated. Differential thermal analysis measures the amount of energy (heat) absorbed by the sample (indicating that the sample has undergone an endothermic reaction) or liberated by the sample (indicating that the sample has undergone an exothermic reaction) as a function of the temperature to which the sample is heated. FIG. 4 is a plot of the results obtained by heating the mixture of catalytic material powder and lubricating oil in a temperature regime ranging from ambient temperature to 600° C. and recording the TGA/DTA data. The DTA peak area was corrected for the weight change determined by the TGA so that the results attained are proportional to the amount of lubricating oil combusted, i.e., to the effectiveness of the tested ceria-alumina catalytic materials, which are identical except for the varying platinum metal loadings. The results attained are plotted in FIG. 4 wherein, despite some experimental scatter in the data points, the trend line indicates substantially no effect of the platinum content of the catalytic material insofar as lubricating oil combustion is concerned. Thus, about the same proportion of combustion was attained for the ceria-alumina catalytic material containing no platinum as for that containing incremental amounts of platinum up to and including the equivalent of 5 g/ft$^3$ on a 400 cpsi carrier.

EXAMPLE 8A

An equivalent test of silica based and silica-niobia based refractory metal oxide powders on which varying amounts of platinum were dispersed was carried out. Those test results showed that the ceria-alumina catalytic material of the present invention provided better performance for lubricating oil combustion as measured by DTA and therefore, by implication, for catalytic oxidation of VOF in diesel engine exhaust.

EXAMPLE 9

S-3 and comparative Comp.4 catalyst samples were tested on the exhaust of the Caterpillar 3176 engine. As previously noted, this engine runs with a considerably hotter exhaust than the Cummins 6BT engine and test catalysts of the same size (9 inches by 6 inches providing a catalyst volume of 6.25 liters) were tested on this larger engine, providing a catalyst volume-to-engine displacement ratio of 0.607. S-3 and Comp.4 catalyst samples were aged for 50 hours on an aging cycle similar to that described in Example 5 but from a minimum of about 300° C. to a maximum of about 530° C.

The results of this test are shown in TABLE IX as the average of six hot-start runs in accordance with the Federal Test Procedure.

catalyst exhibited lower total particulates and VOF removal levels on the Caterpillar 3176 engine than on the Cummins 6BT engine is attributable to the smaller catalyst volume relative to engine size encountered on the Caterpillar engine test and to the fact that the concentration of VOF, the component most vigorously treated by the catalyst, is some 40 percent lower in the exhaust of the Caterpillar engine than in the exhaust of the Cummins engine.

EXAMPLE 10

In order to compare the effect on conversion of $SO_2$ to $SO_3$, and thus sulfate-make of a catalyst, three comparative samples, one of which (designated Comp.11) is a commercially available diesel exhaust catalyst, and each containing high platinum group metal loadings, were compared to a fourth sample comprising an embodiment of the present invention. Three samples, Comp.1, Comp.2 and S-3, were prepared generally in accordance with the procedure of Example 1 to coat cylindrical carriers comprising 400 cpsi cordierite cores measuring 1.5 inches in diameter by 3 inches in length. The samples were aged for 10 hours at 500° C. by having a mixture of 10 percent steam in air flowed through each sample. Comparative sample Comp.1 comprised 50 g/ft$^3$ of platinum disposed on an activated alumina carrier and comparative sample Comp.2 had a 50 g/ft$^3$ platinum group metal loading, the platinum group metal comprising platinum and rhodium in a 5:1 weight ratio disposed on a ceria-alumina catalytic material comprising 53.8 percent by weight alumina and 46.2 percent by weight aluminum-stabilized ceria. The S-3 sample comprised, in accordance with one embodiment of the present invention, 0.5 g/ft$^3$ of platinum dispersed on a ceria-alumina catalytic material comprising 46.2 percent by weight aluminum-stabilized ceria and 53.8 percent by weight alumina with one-half the platinum metal dispersed on the aluminum-stabilized ceria and one-half the platinum metal dispersed on the alumina. The commercially available catalyst for diesel exhaust applications was analyzed and found to comprise a catalytic material dispersed on a honeycomb-type carrier

TABLE IX

| Catalyst Sample | HC | CO | NOx | TPM | VOF | Sulfate | Carbon + Other |
|---|---|---|---|---|---|---|---|
| None - Untreated engine exhaust | | | | | | | |
| Grams[a] | 0.123 | 3.48 | 5.06 | 0.168 | 0.0363 | 0.0052 | 0.1265 |
| S-3 | | | | | | | |
| Grams[a] | 0.1566 | 2.5 | 4.95 | 0.138 | 0.0213 | 0.0039 | 0.1128 |
| % C[b] | 54 | 28.2 | 2.2 | 17.9 | 41.3 | 25 | 10.8 |
| Comp. 4 | | | | | | | |
| Grams | 0.0833 | 1.76 | 5.02 | 0.177 | 0.017 | 0.0217 | 0.1383 |
| % C | 32.3 | 20.7 | 0.8 | −5.4 | 53.2 | −317 | −9.3 |

[a]Grams per brake horsepower-hour
[b]"% C" means the percentage conversion of the indicated constituents. A negative % C means the treated exhaust contained more of the constituent than did the untreated exhaust.

The results summarized in TABLE IX show that the S-3 catalyst reduced total particulate emissions by 17.9 percent and VOF by 41.3 percent whereas the Comp.4 sample, although it gave a higher VOF reduction at 53.2 percent, resulted in an increase of total particulate emissions, because of its very high sulfate make which resulted in sulfate emissions 317 percent higher than those emitted in the untreated exhaust. The tendency of the Comp.4 sample to produce large amounts of sulfate in the hot exhaust environment of the Caterpillar 3176 engine stands in marked contrast to the efficiency of the S-3 catalyst in attaining a 25 percent reduction in sulfate emissions and therefore an overall reduction in total particulates. The fact that the S-3 having 400 cells per square inch. The commercial catalyst contained about 50 g/ft$^3$ of platinum dispersed on a support comprised primarily of titania, vanadia and alumina. A core 2.5 inches long and 1.5 inches in diameter was cut from the commercial catalyst and this comparative catalyst core was designated as Comp.11. The four catalyst samples were tested at space velocities of 50,000 and 90,000 at temperatures of 275° C., 350° C., 425° C. and 500° C. (In this Example 10 and in Example 11 below, the flow rate of the reaction gas was adjusted as necessary to compensate for the slight difference in catalyst volume so that each tested sample was evaluated at the same space velocity.) Each sample was held at the indicated temperature for 10 minutes during the evaluation. The test gas used in the laboratory diagnostic unit comprised 10 percent steam, 10 percent oxygen, 4.5 percent $CO_2$, 1000 ppm NO, 28.57 ppm heptane (equivalent to 200 ppm $C_1$ hydrocarbons), 28.6 ppm CO, 50 ppm $SO_2$, balance nitrogen. (The percents are volume percents and "ppm" means parts per million by volume.) The results of these evaluations are given in TABLE X.

TABLE X

| Catalyst Sample/ | Percent Conversion at Indicated Space Velocity | | | | | |
|---|---|---|---|---|---|---|
| | 50,000 SV | | | 90,000 SV | | |
| Inlet Temp. | CO | HC | $SO_2$ | CO | HC | $SO_2$ |
| Comp. 1 | | | | | | |
| 275° C. | 99.5 | 68.6 | 56.9 | 94.9 | 52.4 | 29.4 |
| 350° C. | 99.5 | 83.0 | 76.9 | 96.5 | 70.5 | 58.5 |
| 425° C. | 100 | 87.4 | 94.3 | — | — | — |
| 500° C. | 100 | 89.0 | 92.2 | — | — | — |
| Comp. 2 | | | | | | |
| 275° C. | 100 | 52.5 | — | 98.5 | 47.6 | 8.0 |
| 350° C. | 99.0 | 77.5 | 11.8 | 96.9 | 61.7 | 9.8 |
| 425° C. | 99.0 | 84.2 | 31.4 | 96.0 | 74.4 | 23.5 |
| 500° C. | 98.1 | 90.7 | 47.1 | 95.5 | 73.2 | 37.3 |
| Comp. 11 | | | | | | |
| 275° C. | 97.1 | 16.7 | 0.0 | 84.7 | 4.8 | 2.0 |
| 350° C. | 99.0 | 54.5 | 2.0 | 93.0 | 41.0 | 2.0 |
| 425° C. | 99.5 | 75.0 | 23.6 | 97.0 | 63.2 | 15.7 |
| 500° C. | 99.5 | 85.9 | 54.9 | 97.4 | 73.2 | 38.0 |
| S-3 | | | | | | |
| 275° C. | 30.5 | 2.4 | 0.0 | 10.9 | 0.0 | 0.0 |
| 350° C. | 68.3 | 9.8 | 4.0 | 52.4 | 9.5 | 0.0 |
| 425° C. | 84.3 | 31.6 | 11.8 | 59.5 | 24.3 | 3.9 |
| 500° C. | 84.4 | 47.4 | 12.0 | 60.0 | 28.6 | 4.1 |

The data of TABLE X shows that the comparative samples Comp.1 and Comp.2 exhibit very high conversion of $SO_2$ to $SO_3$, and thus high sulfate make, even at the lowest test temperature of 275° C. and high space velocity of 90,000. Although comparative sample Comp.2 exhibits less sulfate make than Comp.1 (but significantlly more than catalyst S-3, discussed below), this is believed to be due primarily to the modifying effect of rhodium on the $SO_2$ oxidation activity of platinum. The Comp.2 catalyst has the economic disadvantage of being too costly because of the very high cost of rhodium even as compared to the cost of platinum. Both comparative samples Comp.1 and Comp.2 show high HC and CO conversion. S-3, the sample in accordance with an embodiment of the present invention, exhibits greatly reduced SO conversion relative to both Comp.1 and Comp.2 with practically no SO conversion occurring in the low temperature regime and with relatively small $SO_2$ conversion even at the high temperature regime. Some activity for conversion of gaseous HC and CO is exhibited by catalyst S-3, especially at the high temperature regime where good CO and moderate HC activity is seen. The data of TABLE X thus clearly demonstrate that the utilization of a low platinum loading on the ceria-alumina catalytic material of the present invention provides excellent control of $SO_2$ oxidation and consequently excellent control of total particulates emission in a diesel engine exhaust. It should be noted that the diagnostic test is a very stringent test of sulfate oxidation as compared to actual engine performance. Experience has shown that a given catalyst will perform better with respect to sulfate oxidation in treating an actual diesel engine exhaust than it will in the diagnostic engine test.

The comparative catalyst sample Comp.11 is seen to suppress $SO_2$ oxidation in a manner comparable to that of sample S-3, but only up to a temperature between 350° and 425° C. At 425° C. and higher temperatures the Comp.11 sample exhibits greatly increased $SO_2$ oxidation as compared to the S-3 catalyst sample. Accordingly, the catalyst sample of the present invention, even with a 0.5 g/ft$^3$ platinum loading, appears to be significantly better with respect to $SO_2$ oxidation in higher temperature regimes than the commercial catalyst of Comp.11. The comparative samples Comp.1, Comp.2 and Comp.11 all contain high platinum loadings and consequently show higher HC and CO conversion than does the 0.5 g/ft$^3$ platinum S-3 catalyst sample. However, as pointed out elsewhere herein, HC and CO emissions generally satisfactorily controlled by engine design and the problem which the art is seeking to overcome is to control the total particulates emissions which, as noted above, is in part a function of sulfate make. The catalysts of the present invention, with no or a very low loading of platinum, show excellent activity for reducing total particulate emissions because of their unexpected good activity for oxidizing VOF and their low sulfate make. Further, it is obviously economically advantageous to eliminate or drastically reduce the platinum metal loading in accordance with the teachings of the present invention.

EXAMPLE 11

A catalyst sample in accordance with an embodiment of the present invention was prepared and designated sample S-3P. Catalyst sample S-3P is identical to catalyst sample S-3 of Example 10 except that it contains a platinum loading of 2.0 g/ft$^3$. The S-3P catalyst sample was 3.0 inches long by 1.5 inches in diameter. Catalyst S-3P was tested by passing therethrough a test gas in the same manner as described in Example 10 at space velocities of 50,000 and 90,000 at temperatures of 275° C., 350° C., 425° C. and 500° C. The results of this test are shown in TABLE XI.

TABLE XI

| Catalyst Sample/ | Percent Conversion at Indicated Space Velocity | | | | | |
|---|---|---|---|---|---|---|
| | 50,000 SV | | | 90,000 SV | | |
| Inlet Temp. | CO | HC | $SO_2$ | CO | HC | $SO_2$ |
| S-3P | | | | | | |
| 275° C. | 99.0 | 10.0 | 16.0 | 88.5 | 2.6 | 2.0 |
| 350° C. | 100 | 87.8 | 21.6 | 98.0 | 74.1 | 5.9 |
| 425° C. | 100 | 90.5 | 33.3 | 98.5 | 82.7 | 19.2 |
| 500° C. | 99.5 | 83.1 | 35.3 | 98.1 | 73.3 | 31.4 |

TABLE XI shows, as would be expected, that the S-3P catalyst exhibits higher $SO_2$ oxidation at all temperature levels and space velocities as compared to the S-3 catalyst of Example 10 which contains 0.5 g/ft$^3$ of platinum, one-fourth of the amount of platinum (2.0 g/ft$^3$) which S-3P contains. However, the S-3P sample also exhibited higher HC and CO conversions, which shows that a modest increase in platinum loading, still keeping the total platinum loading to very low levels as compared to prior art catalysts, can accommodate a higher HC and CO conversion but at the potential cost of somewhat increased particulate emissions because of additional sulfate make. However, in certain circumstances it may be desirable to attain the higher HC and CO conversions attainable with the catalyst of the present invention by a modest increase in platinum loading.

EXAMPLE 12

In order to evaluate the effect of ceria in the catalyst composition of the present invention, a comparative sample, Comp.1 of Example 4, was prepared generally in accordance with the procedure of Example 1 but omitting the ceria component of the catalytic material. Thus, the resulting catalyst comprised an activated alumina washcoat having 0.5 g/ft³ of platinum disposed thereon. This sample designated Comp.3C was subjected to the same test as in Examples 10 and 11 and the results thereof are summarized in TABLE XII and show that the $SO_2$ conversion over this catalyst is significantly greater than for the S-3 catalyst, especially at low temperatures. Higher conversions of HC and CO were also attained. This data clearly indicate that the ceria plays an important modifying role in the oxidation activity of the platinum.

TABLE XII

| Catalyst | Percent Conversion at Indicated Space Velocity | | | | | |
|---|---|---|---|---|---|---|
| Sample/ | 50,000 SV | | | 90,000 SV | | |
| Inlet Temp. | CO | HC | $SO_2$ | CO | HC | $SO_2$ |
| Comp. 3C | | | | | | |
| 275° C. | 96.6 | 10.0 | 16.3 | 85.4 | 4.9 | 4.6 |
| 350° C. | 99.6 | 86.5 | 18.9 | 95.0 | 57.4 | 12.6 |
| 425° C. | 99.9 | 90.5 | 35.5 | 98.1 | 74.0 | 33.7 |
| 500° C. | 99.7 | 83.7 | 42.2 | 98.3 | 74.0 | 33.7 |

EXAMPLE 13

A catalyst was prepared in accordance with the present invention generally following the teachings of Example 1, except that no alumina undercoat was utilized. Thus, this sample comprised 1.95 g/ft³ of a ceria-alumina catalytic material containing 46.2 weight percent aluminum-stabilized ceria (164 m²/g BET surface area) and 53.8 weight percent alumina (150 m²/g BET surface area) disposed directly upon the carrier without an alumina undercoat, and having 0.5 g/ft³ of platinum dispersed thereon. This catalyst, designated S-3SC was aged and tested in the same manner as in Example 10 and the results thereof are shown in TABLE XIII. The performance of this sample is seen to be essentially the same as that of S-3 (Example 10, TABLE X) for the gas phase reactions, indicating that the presence of the alumina undercoat is not essential with respect to either low sulfate make or HC and CO oxidation.

TABLE XIII

| Catalyst | Percent Conversion at Indicated Space Velocity | | | | | |
|---|---|---|---|---|---|---|
| Sample/ | 50,000 SV | | | 90,000 SV | | |
| Inlet Temp. | CO | HC | $SO_2$ | CO | HC | $SO_2$ |
| S-3SC | | | | | | |
| 275° C. | 25.4 | 0.0 | 2.0 | 31.0 | 0.0 | 0.0 |
| 350° C. | 71.9 | 11.9 | 5.9 | 62.5 | 15.8 | 4.1 |
| 425° C. | 85.6 | 28.9 | 9.8 | 78.7 | 29.3 | 5.9 |
| 500° C. | 86.3 | 48.7 | 20.4 | 76.1 | 42.5 | 10.7 |

EXAMPLE 14

A. Catalysts were prepared generally in accordance with the procedures of Example 1 to provide a series of three otherwise identical compositions containing a ceria-alumina catalytic material in accordance with the teachings of the present invention having platinum dispersed thereon, including 0.0, 0.5 and 2.0 g/ft³ platinum. Each catalyst comprised a γ-alumina undercoat at a loading of 1.0 g/in³ upon which was coated a top coat layer comprised of 1.05 g/in³ γ-alumina plus 0.90 g/in³ alumina-stabilized ceria (2.5 weight percent $Al_2O_3$ based on the combined weight of bulk ceria and alumina dispersed therein). The catalysts were coated onto a 9 inch diameter by 6 inch long, 400 cpsi cordierite substrate. The resulting catalyst samples were designated as S-4 (0.0 g/ft³ platinum, aged 24 hours), S-5 (0.5 g/ft³ platinum, aged 25 hours) and S-6 (2.0 g/ft³ platinum, aged 24 hours).

B. The three catalyst samples were conditioned prior to evaluation using an aging cycle involving 20 minutes each at Modes 2,6 and 8 of the European 13 Mode Test Procedure (ECE R.49 Thirteen Mode Cycle). This Test Procedure is set forth in the Society of Automotive Engineers Publication, SAE Paper #880715, published at the International Congress and Exposition, Detroit, Mich. Feb. 29 through Mar. 4, 1988, by Georgio M. Cornetti et al. The disclosure of this SAE publication is incorporated by reference herein. Prior to testing to develop the data of TABLE XV and FIGS. 5–8, the three catalyst samples were aged 24 or 25 hours as indicated below on a Cummins 6BT turbocharged diesel engine having a 5.9 liter displacement and rated at 190 horsepower. For both aging and test purposes, the engine was run with low sulfur fuel (0.05 weight percent sulfur) under steady state conditions using test modes selected from the aforesaid European 13 Mode Cycle Test Procedure.

The engine conditions for the test modes along with average (for five runs) catalyst inlet temperatures and baseline emissions (of untreated engine exhaust) are shown in TABLE XIV.

TABLE XIV

Cummins 6BT 190 HP Turbocharged Diesel Engine, 5.9 Liter Displacement, Conditions For Steady State Catalyst Tests

| | Engine Conditions | | |
|---|---|---|---|
| Test Mode No. | rpm | % Load | Average Catalyst Inlet Temp. (°C.) |
| 8 | 2515 | 100 | 571 ± 2 |
| 10 | 2515 | 50 | 338 ± 4 |
| 6 | 1609 | 100 | 549 ± 5 |
| 4 | 1609 | 50 | 400 ± 4 |
| 2 | 1560 | 10 | 214 ± 3 |
| 1 | 803 | Low | 128 ± 16 |

| Baseline Emissions - Untreated Exhaust | | | | |
|---|---|---|---|---|
| Test | Average Emissions (g-bhp-hr)[1] | | | |
| Mode No. | TPM | SOF | HC | CO |
| 8 | 0.097 | 0.010 | 0.122 | 0.46 |
| 10 | 0.151 | 0.047 | 0.212 | 0.68 |
| 6 | 0.221 | 0.016 | 0.099 | 2.23 |
| 4 | 0.146 | 0.023 | 0.103 | 0.52 |
| 2 | 0.265 | 0.137 | 0.541 | 2.57 |
| 1 | — | 0.078 | 1.04 | 3.01 |

[1]grams per brake horsepower hour

The conditioned and aged catalyst samples S-4, S-5 and S-6 were tested for conversion of emission components in diesel exhaust generated by the test engine used to generate the data of Table XIV, as a function of steady state test mode and catalyst inlet temperature, i.e., the temperature of the diesel engine exhaust introduced to the catalyst. The results are summarized in TABLE XV.

TABLE XV

| Sample/ (Pt Load g/ft³) | Test Mode No. | Cat. Inlet Temp. °C. | % Removal SOF | TPM | HC | CO |
|---|---|---|---|---|---|---|
| S-4 (0.0) | 2 | 209 | 72 | 63 | 31 | 1 |
|  | 10 | 335 | 60 | 27 | 32 | 7 |
|  | 4 | 399 | 62 | 18 | 38 | 18 |
|  | 6 | 547 | 84 | −40 | 44 | 27 |
|  | 8 | 572 | 79 | −181 | 39 | −4 |
| S-5 (0.5) | 2 | 215 | 60 | 45 | 27 | 6 |
|  | 10 | 343 | 58 | 28 | 41 | 63 |
|  | 6 | 549 | 91 | −64 | 56 | 85 |
|  | 8 | 570 | 80 | −201 | 62 | 45 |
| S-6 (2.0) | 1 | 127 | 56 | 52 | 37 | −1 |
|  | 2 | 215 | 61 | 61 | 39 | 8 |
|  | 10 | 341 | 53 | 31 | 74 | 86 |
|  | 4 | 397 | 61 | 22 | 82 | 87 |
|  | 6 | 554 | 89 | −60 | 78 | 95 |
|  | 8 | 572 | 79 | −200 | 71 | 70 |

The data of TABLE XV show that all three catalysts are comparable in SOF removal performance as a function of temperature, with the catalyst containing no platinum (S-4) performing as well as the catalysts containing platinum (S-5 and S-6).

Figure 5:
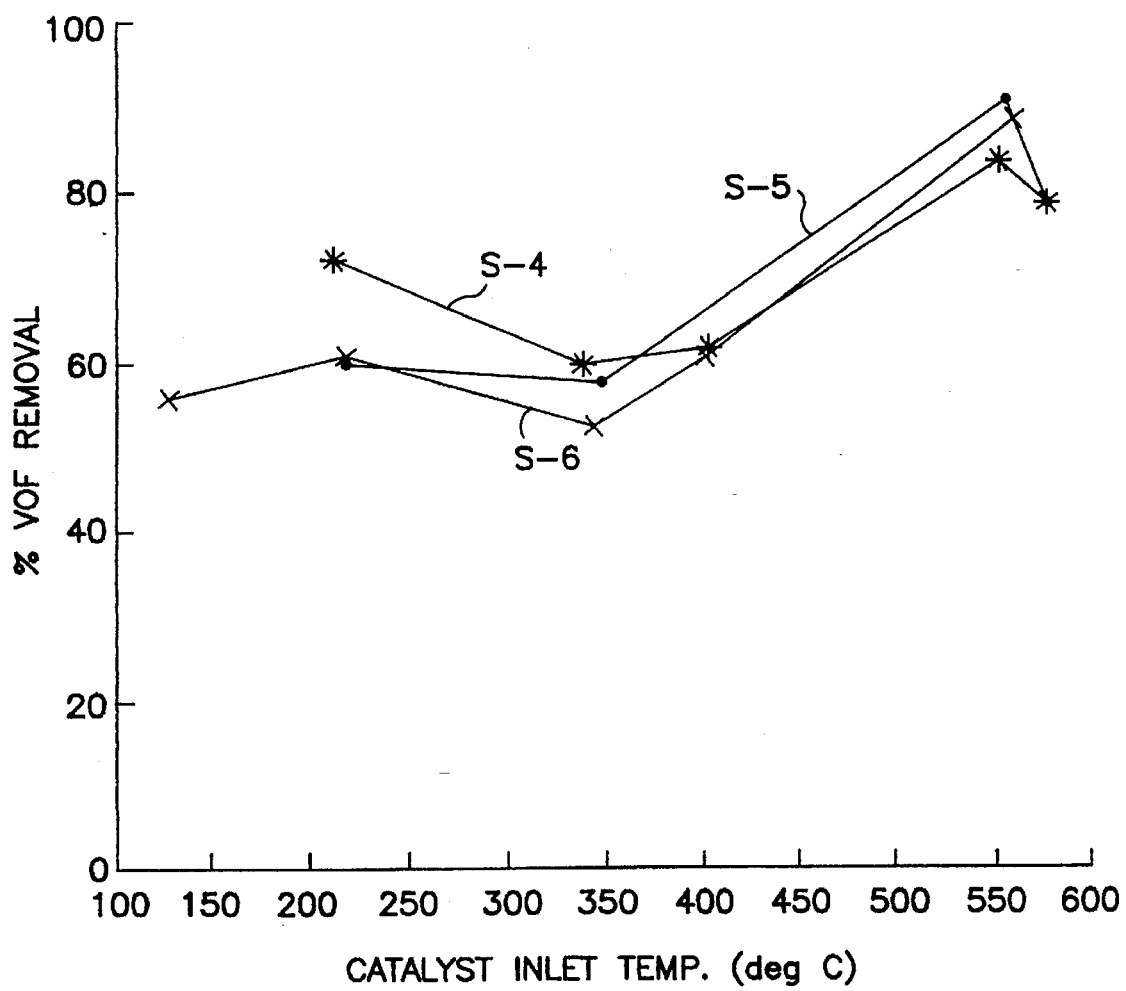
FIGS. 5 through 8 are plots showing various aspects of diesel engine exhaust treatment performance of three aged catalyst samples made in accordance with certain embodiments of the present invention as a function of the operating temperature of the catalysts, as follows.

With reference to TABLE XV and FIGS. 5–8, it is seen that the SOF removal performance as a function of inlet temperature of the three catalysts are compared in FIG. 5. As can be seen, all three samples are comparable across the temperature range of about 120° to 575° C. with the sample containing no platinum (S-4) performing as well as or better than, the platinum-containing samples S-5 and S-6.

Figure 6:
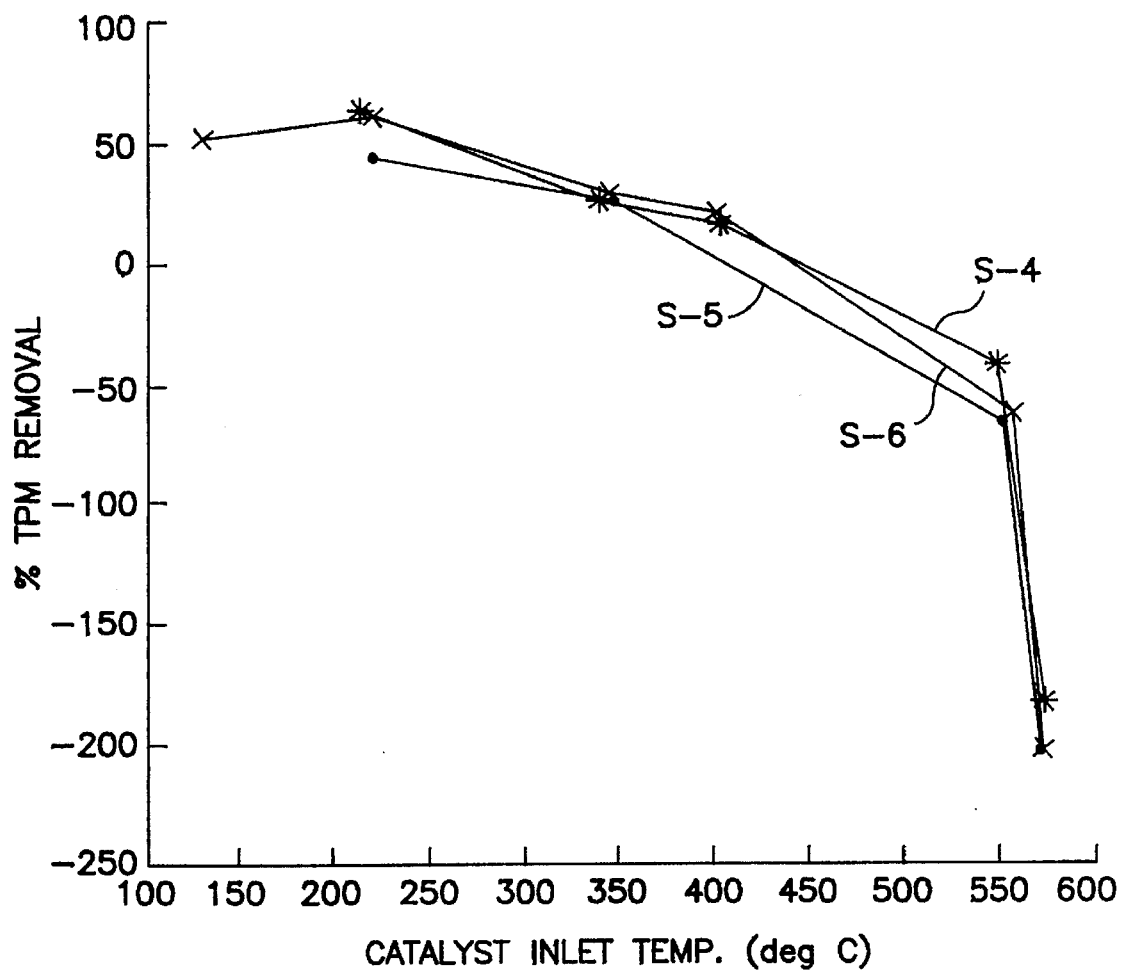

The SOF removal performance is also reflected in the total particulate (TPM) removal levels of the three catalysts which are compared in FIG. 6. The platinum-free catalyst sample is comparable to, or better than, the platinum-containing catalyst samples S-5 and S-6 at all temperatures. Note also, all three catalyst samples make particulates at the highest temperatures of the test. This is due to sulfate-make from the oxidation of gas phase $SO_2$ to $SO_3$ Thus, even the platinum-free sample makes sulfate at extremely high temperatures, but apparently to a slightly lesser extent than the platinum-containing samples, reflecting the lower gas phase activity of the platinum-free sample.

Figure 7:
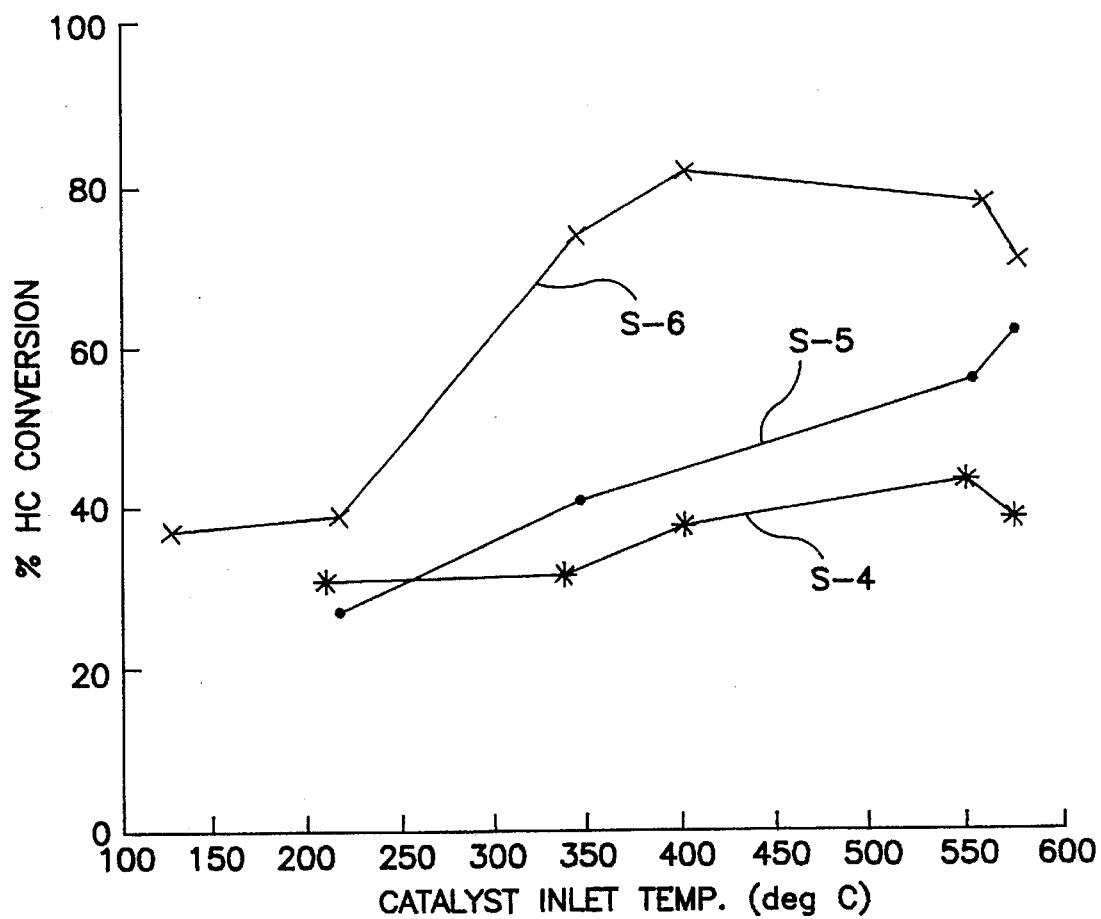
Figure 8:
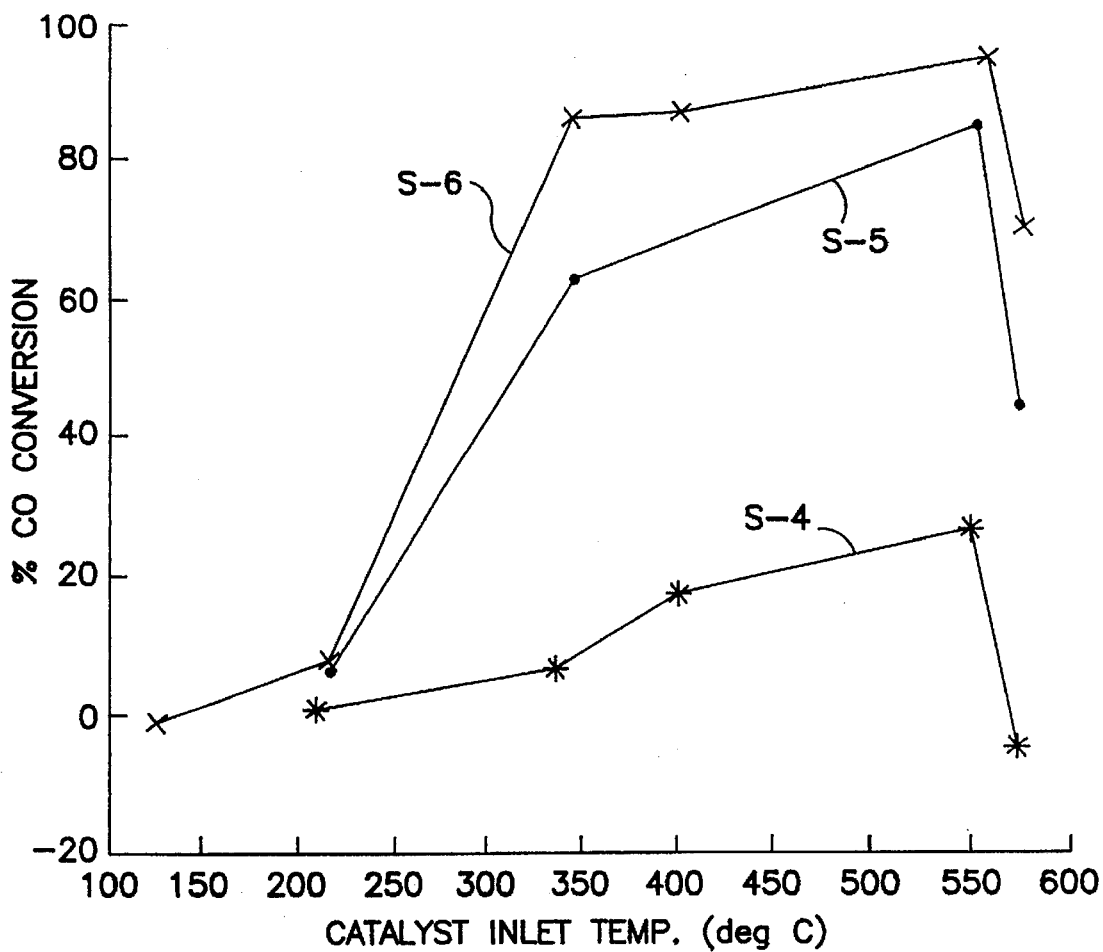

The gas phase activity of the three catalyst samples are compared in FIGS. 7 and 8 for, respectively, hydrocarbon ("HC") and carbon monoxide ("CO") gas phase conversions. Although the platinum-free sample S-4 exhibits some gas phase activity for HC and CO conversion, it is clear from these results that the platinum-containing samples S-5 and S-6 have substantially higher gas phase activity. This is especially clear in the case of CO conversion. The platinum-free sample S-4 has some gas phase activity because the ceria component has activity as an oxidation catalyst.

These results show quite well the surprising finding that a platinum-free catalyst in accordance with the present invention exhibits very good particulates removal from diesel engine exhaust because of its activity for the removal and combustion of VOF, and that the precious metal is not needed to accomplish this function. If there is a need to enhance gas phase HC and CO activity, this can be accomplished separately by adding a limited amount of platinum to the catalyst.

While the invention has been described in detail with respect to specific preferred embodiments thereof it will be appreciated that variations thereto may be made which nonetheless lie within the scope of the invention and the appended claims.

What is claimed is:

1. An oxidation catalyst composition comprises a refractory carrier on which is disposed a coating of a ceria-alumina catalytic material consisting essentially of a combination of ceria having a BET surface area of at least about 10 m²/g and alumina having a BET surface area of at least about 10 m²/g, in the absence of a platinum group metal.

2. The catalyst composition of claim 1 wherein the ceria and alumina each comprises from about 5 to 95 percent by weight of the combination.

3. The catalyst composition of claim 1 wherein the ceria and alumina each comprises from about 10 to 90 percent by weight of the combination.

4. The catalyst composition of claim 1, claim 2 or claim 3 wherein the ceria and the alumina are each disposed in respective discrete layers, one overlying the other.

5. The catalyst composition of claim 1, claim 2 or claim 3 wherein the ceria comprises an aluminum-stabilized ceria.

6. The catalyst composition of claim 1 wherein the ceria and alumina each comprises from about 40 to 60 percent by weight of the combination.

7. The catalyst composition of claim 1 wherein the ceria and the alumina each has a BET surface area of from about 25 m²/g to 200 m²/g.

8. A catalyst composition for purifying diesel engine exhaust comprises a refractory carrier on which is disposed a coating of a catalytic material consisting essentially of a combination of ceria having a BET surface area of at least about 10 m²/g and alumina having a BET surface of at least about 10 m²/g, the ceria and alumina each comprising from about 5 to 95 percent by weight of the combination, in the absence of a platinum group metal.

9. The catalyst composition of claim 8 wherein the ceria and alumina each comprises from about 10 to 90 percent by weight of the combination.

10. The catalyst composition of claim 8 wherein the ceria and the alumina each comprises from about 40 to 60 percent by weight of the combination.

11. The catalyst composition of claim 8, wherein the ceria comprises aluminum-stabilized ceria.

12. The catalyst composition of claim 8, claim 9 or claim 10 wherein the ceria and the alumina are each disposed in respective discrete layers, one overlying the other.

* * * * *